US012741602B2

(12) United States Patent
Gignac et al.

(10) Patent No.: US 12,741,602 B2
(45) Date of Patent: Sep. 22, 2026

(54) SCALABLE SOFTWARE-DEFINED VEHICLE PLATFORM MANAGEMENT AND FUNCTIONS

(71) Applicant: Intel Corporation, Santa Clara, CA (US)

(72) Inventors: Donald Raymond Gignac, Lake Oswego, OR (US); Maria Soledad Elli, Seattle, WA (US); Rebeca Maria Delgado Gomez, Novi, MI (US); Ruchika Singh, Chandler, AZ (US); John Charles Weast, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 18/899,364

(22) Filed: Sep. 27, 2024

(65) Prior Publication Data

US 2026/0091744 A1 Apr. 2, 2026

(51) Int. Cl.
*B60R 16/023* (2006.01)
*B60R 16/03* (2006.01)
*G07C 5/00* (2006.01)

(52) U.S. Cl.
CPC .......... *B60R 16/03* (2013.01); *B60R 16/0231* (2013.01); *G07C 5/008* (2013.01)

(58) Field of Classification Search
CPC ...... B60R 16/03; B60R 16/0231; G07C 5/008
See application file for complete search history.

(56) References Cited

U.S. PATENT DOCUMENTS 8,972,161 B1 * 3/2015 Koebler .................... B60T 1/10 701/123
12,024,028 B2 * 7/2024 Maury .................... G06F 16/21
2005/0138438 A1 * 6/2005 Bodas .................. G06F 1/3203 713/300
2009/0210726 A1 * 8/2009 Song .................. G06F 11/3055 713/300

(Continued)

FOREIGN PATENT DOCUMENTS

CN 116373602 A * 7/2023 ................ B60L 1/00
CN 118182357 A * 6/2024 ................ B60L 1/00

OTHER PUBLICATIONS

CN-116373602-A machine translation (Year: 2023).*

(Continued)

*Primary Examiner* — Dino Kujundzic
(74) *Attorney, Agent, or Firm* — Banner & Witcoff, Ltd.

(57) ABSTRACT

Various systems and methods for establishing the management and functions of a software-defined vehicle platform are disclosed. An example technique for configuring power usage and management includes: evaluating data that enumerates characteristics of multiple vehicle electronic control units (ECUs) of the vehicle; determining power usage characteristics of the ECUs, such as power requirements and available power states of the ECUs; determining a power usage policy to apply in the vehicle, based on the power usage characteristics of the ECUs and operational conditions of the vehicle; and generating control signals to change power states used by the ECUs, based on the determined power usage policy (e.g., a power usage policy that includes restrictions for the vehicle and the various ECUs).

20 Claims, 17 Drawing Sheets

(56) References Cited

U.S. PATENT DOCUMENTS

| | | | | |
|---|---|---|---|---|
| 2009/0217065 | A1 * | 8/2009 | Araujo, Jr. | G06F 1/3203 713/320 |
| 2020/0353944 | A1 * | 11/2020 | Urano | G05D 1/0088 |
| 2023/0205301 | A1 * | 6/2023 | Duenas | G06F 1/3234 713/300 |

OTHER PUBLICATIONS

CN-118182357-A machine translation (Year: 2024).*

C. Schmutzler, A. Kruger, F. Schuster and M. Simons, "Energy efficiency in automotive networks: Assessment and concepts," 2010 International Conference on High Performance Computing & Simulation, Caen, France, 2010, pp. 232-240. (Year: 2010).*

"Intel Whole Vehicle Graphic", Intel Automotive, (2024), 1 pg.

Weast, Jack, "Intels Whole Vehicle Approach to Boost Automakers Profits", Intel Newsroom, (Jul. 2024), 6 pgs.

Intel Automotive White Paper, "Vehcile Platform Power Management Standard Proposal", 12 pages, 2024.

* cited by examiner

SCALABLE SOFTWARE-DEFINED VEHICLE PLATFORM MANAGEMENT AND FUNCTIONS

BACKGROUND

Current approaches for the management of vehicle subsystems are often reliant on significant engineering and customization before the vehicle is manufactured. For example, power management at the vehicle level is often performed in a decentralized and static manner, using approaches that do not scale over time as vehicle architectures change from generation to generation. Each vehicle manufacturer often defines its own power-related requirements for the various electronic control units (ECUs) used in the different vehicle subsystems of a vehicle design. This causes different hardware vendors of ECUs and ECU components to define and execute proprietary power management policies.

Additionally, current vehicle architectures do not include consistency of power management interfaces implemented at the software level, resulting in many variations of custom-made power management hardware and functions. Each of these issues may add inefficiencies to vehicles, especially during the integration of the hundreds of ECUs and devices that are included in a vehicle, often sourced from a diverse set of suppliers.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
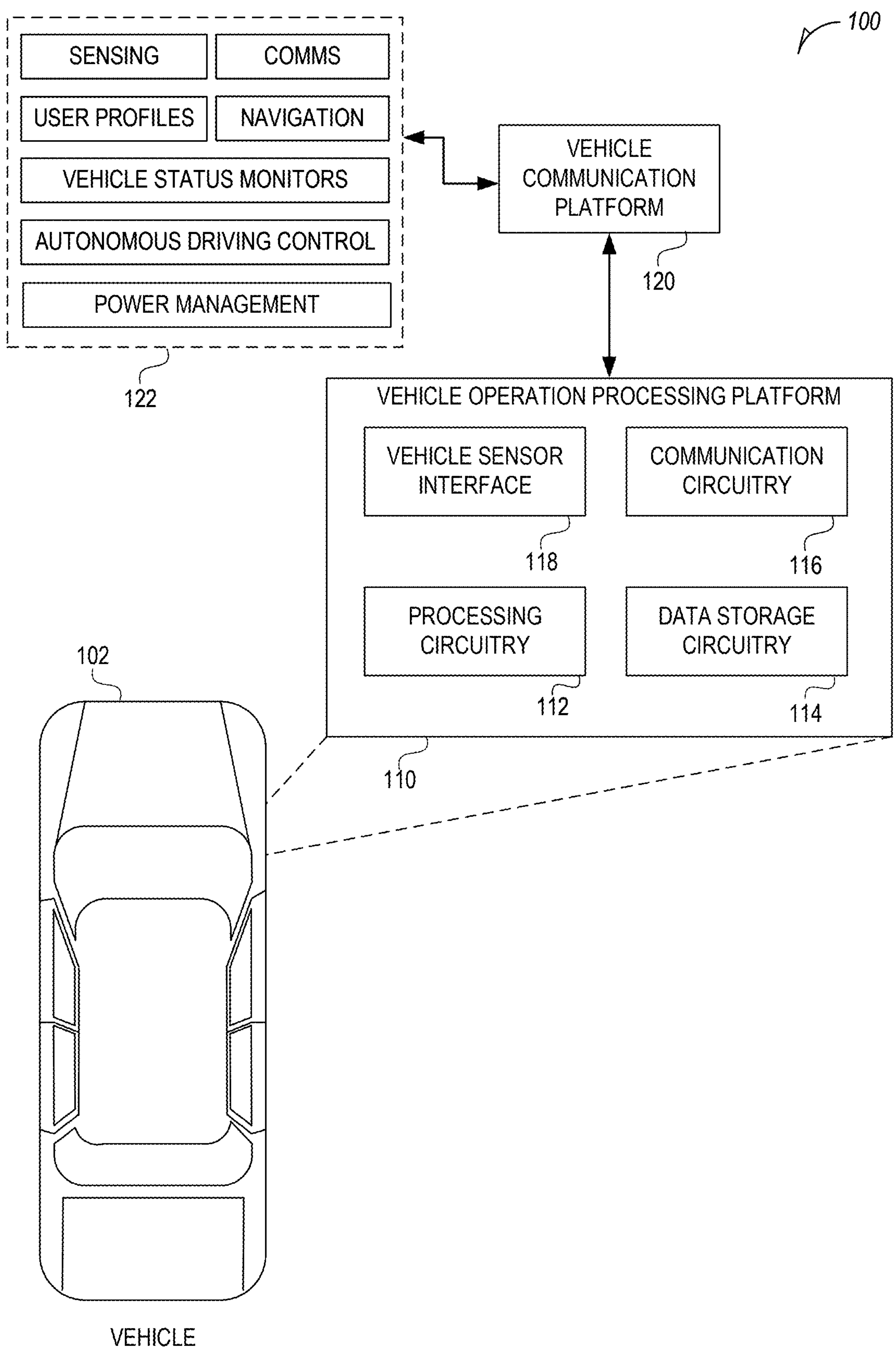
FIG. 1 depicts a system to implement a vehicle operation processing platform in a vehicle, according to an example.

In the following description, for purposes of explanation, numerous specific details are set forth in order to provide a thorough understanding of some example embodiments. It will be evident, however, to one skilled in the art that the present disclosure may be practiced without these specific details.

A first aspect of the present disclosure includes a vehicle-platform power management system that defines software components and interfaces, designed for enabling a centralized control over the power management of most or all vehicle ECUs and components. This power management system establishes a "system of systems" architecture for vehicle components that enables comprehensive power oversight and management at the vehicle level. Additionally, the power management system includes cloud-connected functionality to enable intelligent, context-aware power management decisions based on factors such as traffic and weather, enhancing efficiency across a fleet of vehicles.

This power management system introduces various advantages over existing design and implementation approaches. Many types of vehicle components and subsystems are fully powered at all times due to legacy design patterns originating from Internal Combustion Engine (ICE) vehicles, where energy efficiency was not a large concern. Additionally, even if vehicle manufacturers implement a power management scheme, such schemes are often decentralized power management policies that consider respective subsystems independently. These approaches underscore the technical need for a power management system that can define standard interfaces and streamline the integration process, enhancing overall vehicle power efficiency and reducing complexity in the assembly of multi-vendor electronic components. This can also enable the creation and use of new services, for example, insights and optimization algorithms related to power consumption of vehicle hardware.

A second aspect of the present disclosure includes the definition and use of a semantic representation of a scalable software defined vehicle (SDV) architecture for power management and related control functions. This aspect introduces functionality to map ECU or device capability to an ontology of the vehicle interconnections. For instance, the semantic representation and its associated ontology may be defined to provide a definable, visual manner for system architects to develop vehicle power policies with efficiency, without violating non-critical or critical dependencies within respective sub-systems.

This semantic representation and ontology introduce a variety of technical advantages over current approaches. The types of system architectures in modern vehicles are derived from requirement documents and tables within these requirements where communication signals and power management states are defined and then hard coded in each ECU or device. This creates challenges during system definitions and during verification and validation phases. A lack of an ontology also prevents the evaluation of further insights into vehicle power policies and relevant artifacts (such as accurate power consumption or identification of assets and the relationship between assets at the vehicle level).

A third aspect of the present disclosure includes the introduction of a dynamic workload reconfiguration in software-defined vehicles (SDVs) for meeting optimized system-level key performance indicators (KPIs). A vehicle topology of compute elements and devices in a vehicle is created within a hierarchical data structure. This data structure captures information on the different compute elements and devices, and for associated attributes and relationships. For instance, the compute elements can use metadata to describe their type and capabilities and associated SLAs or service level agreements. A vehicle system-level manager utilizes these descriptors when determining how and when to distribute workloads among different control units.

This approach for dynamic workload reconfiguration and data description offers a number of technical advantages for workload management and verification of KPIs. Some approaches for workload movement have been designed for use in conventional data center use cases. However, such approaches cannot be easily applied to vehicles because vehicles offer a finite pool of resources as opposed to an elastic compute offered by the cloud. In addition, specialized workloads such as safety, security, and added constraints can be provided in SDVs, which provide practical limits on workload movement.

FIG. 1 is a schematic drawing illustrating a system 100 to implement a vehicle operation processing platform 110 in a vehicle 102. In some examples, the vehicle operation processing platform 110 may operate the vehicle without human assistance as an autonomous vehicle (AV). AVs may operate in a fully autonomous mode or a partially autonomous mode. When in a partially autonomous mode, the AV may provide some autonomous functionality, such as lane departure monitoring, speed control, collision avoidance, or the like while the human operator performs other aspects of driving, such as steering.

The vehicle 102 may be any type of vehicle, such as a commercial vehicle, a consumer vehicle, a recreation vehicle, a car, a truck, a motorcycle, a boat, a drone, a robot, an airplane, a hovercraft, or any mobile craft. The vehicle 102 may operate at some times in a manual mode where the driver operates the vehicle 102 conventionally using pedals, steering wheel, and other controls. At other times, the vehicle 102 may operate in a fully autonomous mode, where the vehicle 102 operates without user intervention. In addition, the vehicle 102 may operate in a semi-autonomous mode, where the vehicle 102 controls many of the aspects of driving, but the driver may intervene or influence the operation using conventional inputs (e.g., steering wheel) or non-conventional inputs (e.g., voice control). In other examples, the vehicle operation processing platform 110 may implement an advanced driver assistance system (ADAS), which provides aspects of partial automation or computer-directed functions for assisting a human driver with vehicle safety and operation.

The vehicle operation processing platform 110 is depicted as including processing circuitry 112, data storage circuitry 114, communication circuitry 116, and a vehicle sensor interface 118. The processing circuitry 112 and data storage circuitry 114 may implement a central compute node, as discussed in more details in the subsequent figures. The communication circuitry 116 and sensor interface 118 may be used to access a variety of data, including data from functions 122 via a vehicle communication platform 120 (e.g., an internal network or bus in the vehicle 102). Such functions may include those used for the operation of the vehicle and its subsystems, including sensing, communications, autonomous driving, vehicle status, navigation, user profile, and power management functions. More details on implementation of the power management functions are also provided in the subsequent figures.

The vehicle 102 may include a sensor array, such as various forward, side, and rearward facing cameras, radar, LIDAR, ultrasonic, very high-frequency (VHF) radar, or the like. Forward-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some forward-facing cameras may have a relatively wide field of view, even up to 180-degrees. Similarly, a rear-facing camera that is directed at an angle (perhaps 60-degrees off center) to be used to detect traffic in adjacent traffic lanes, may also have a relatively wide field of view, which may overlap the field of view of a forward-facing camera. Side-facing sensors are those that are directed outward from the sides of the vehicle 104. Cameras in the sensor array may include infrared or visible light cameras, able to focus at long-range or short-range with narrow or large fields of view.

The vehicle 102 may include an on-board diagnostics system to record vehicle operation and other aspects of the vehicle's performance, maintenance, or status. The vehicle 102 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like. In operation, the vehicle 102 obtains sensor data via the sensor array interface from sensors integrated in the vehicle 102, or sensors that are communicatively coupled to the vehicle 102. The sensors may include radar, LiDAR, visible light cameras, acoustic sensors, environmental sensors, infrared sensors, or combinations. Radar is useful in nearly all weather and longer range detection, LiDAR is useful for shorter range detection, and cameras are useful for longer ranges but often become less effective in certain weather conditions, such as snow. Combinations of sensors may be used to provide the widest flexibility in varying operating conditions.

Although not shown in detail, the vehicle 102 may utilize its communication circuitry 114 to communicate with a network and external entities. Such a network may include local-area networks (LAN), wide-area networks (WAN), wireless networks (e.g., 802.11 or cellular network), ad hoc networks, personal area networks (e.g., Bluetooth) or other combinations or permutations of network protocols and network types. The network may also encompass in-vehicle networks, such as an on-board diagnostic network (e.g., OBD II), CANbus, Bluetooth, Ethernet, or other in-vehicle, short-range, small-area, or personal networks. In other examples, a mobile device (e.g., smartphone, integrated cellular device) may act as a communication bridge between a local area network inside the vehicle 102 and a wide area network (e.g., the internet) outside of the vehicle.

As will be understood, the electronic and electrical architecture of vehicle platforms has become dramatically complex. A modern vehicle may include hundreds of ECUs, also referred to as electronic control modules (ECMs), where each one of them performs a particular task or a subset of tasks (e.g., Infotainment ECU, Exterior Lighting ECU, ADAS ECU, etc.). These ECUs and other vehicle components are often sourced from a diverse set of suppliers, and automotive OEMs typically impose power requirements on these suppliers dictating a particular behavior. This results in automotive component manufacturers (e.g., Tier 1 and Tier 2 manufacturers and suppliers) having to design and build customized ECUs and software interfaces for each OEM. This approach has clear limitations, producing a vehicle architecture that will likely change with future vehicle architectures as additional software features are added to modern vehicles.

Existing vehicle-platform power management solutions are based on statically defined configurations and governed via factory-installed policies and software that are specific to a vehicle manufacturer and component manufacturer. Additionally, many Electric Vehicle (EV) designs are based on existing internal combustion engine (ICE) platforms with electrical and electronic components designed for continuous peak power consumption. This leads to inefficiencies that directly affect the consumption of vehicles like range and battery size-two important aspects of an EV.

As the modern vehicle architecture changes to address the current consumer demands of vehicle features including gaming, entertainment, and other connected services, there will be an increase in power consumption of the ECUs. This is further complicated by aspects of the vehicle that incorporate more and more features and a technical need to make vehicles more efficient. The following addresses these and other issues by defining a vehicle platform power management system. This vehicle platform power management system relies on software components and software agents for monitoring and orchestration of power policies holistically across the vehicle platform.

Figure 2:
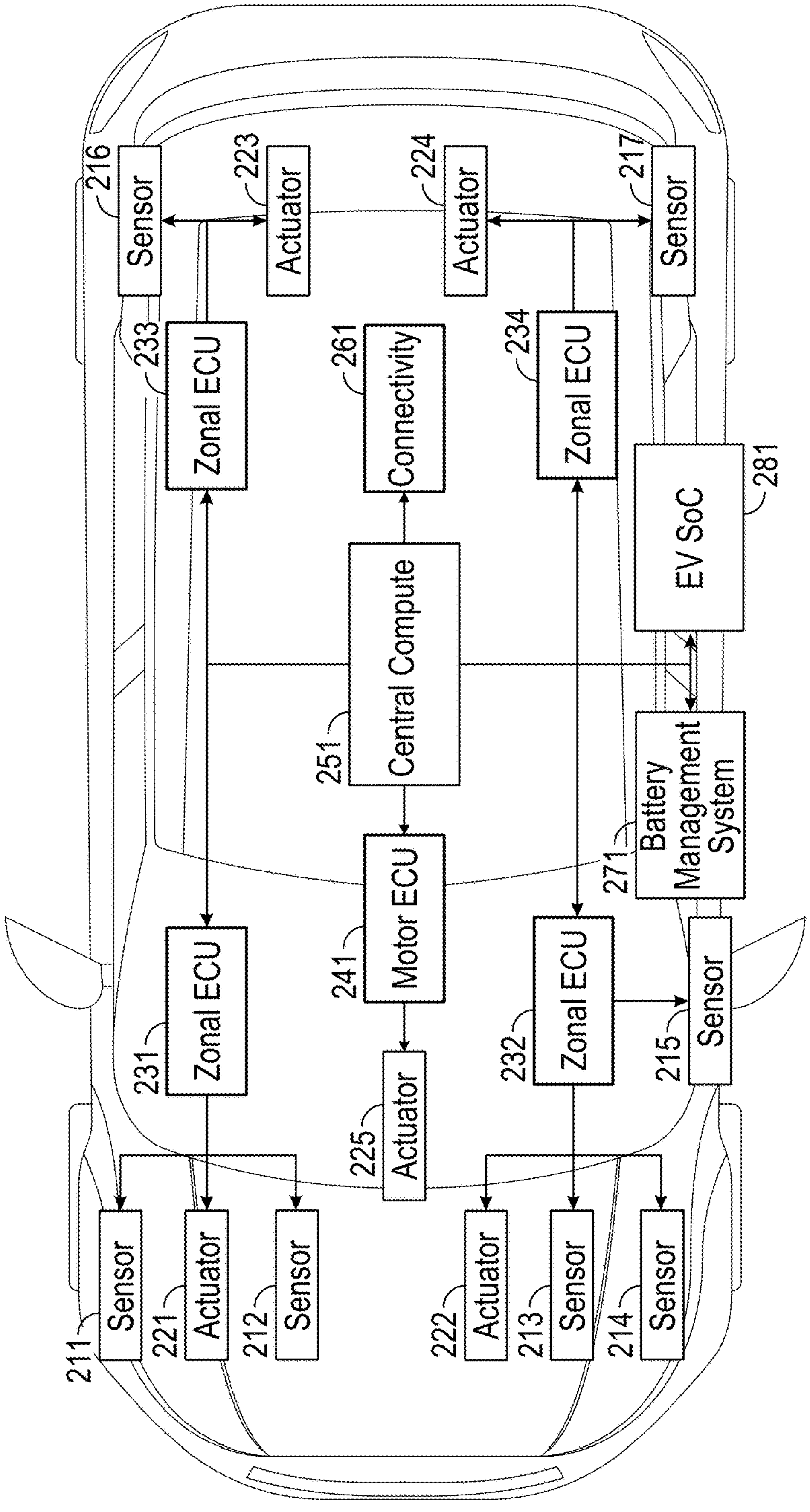
FIG. 2 depicts a schematic of an example vehicle electrical/electronic architecture, according to an example.

FIG. 2 depicts a schematic of an example vehicle electrical/electronic (E/E) architecture. This schematic depicts a mix of zonal compute nodes provided by Zonal ECUs 231, 232, 233, 234 and other ECUs such as a motor ECU 241, a connectivity ECU 261, a battery management system 271, and an EV SoC 281. The Zonal ECUs 231, 232, 233, 234 are connected among sensors 211, 212, 213, 214, 215, 216, 217 and actuators 221, 222, 223, 224; other ECUs such as the motor ECU 241 are connected to actuators or controls such as actuator 225. Each of these components is connected to a Central Compute node 251 and all are linked through the vehicle's main communications backbone (e.g., an interconnect/bus, also referred to as a "Vehicle Platform Communication" backbone), as shown in FIG. 2.

As discussed in the following sections, the Central Compute node 251 is extended to offer power management functions through the use of a vehicle platform power management component, and as coordinated with a central system power management component. In addition to improving the management of power consumption at the vehicle level, these components enable power management policies to be adaptable to varying operational scenarios. For example, a robot taxi operating in the urban environment of San Francisco—which typically involves lower speeds and hills—will have distinct power management requirements compared to a robot taxi cruising on the highways around Dallas. The power management functions enable vehicles to actively monitor and adjust power consumption across different levels of their operational hierarchy.

Figure 3:
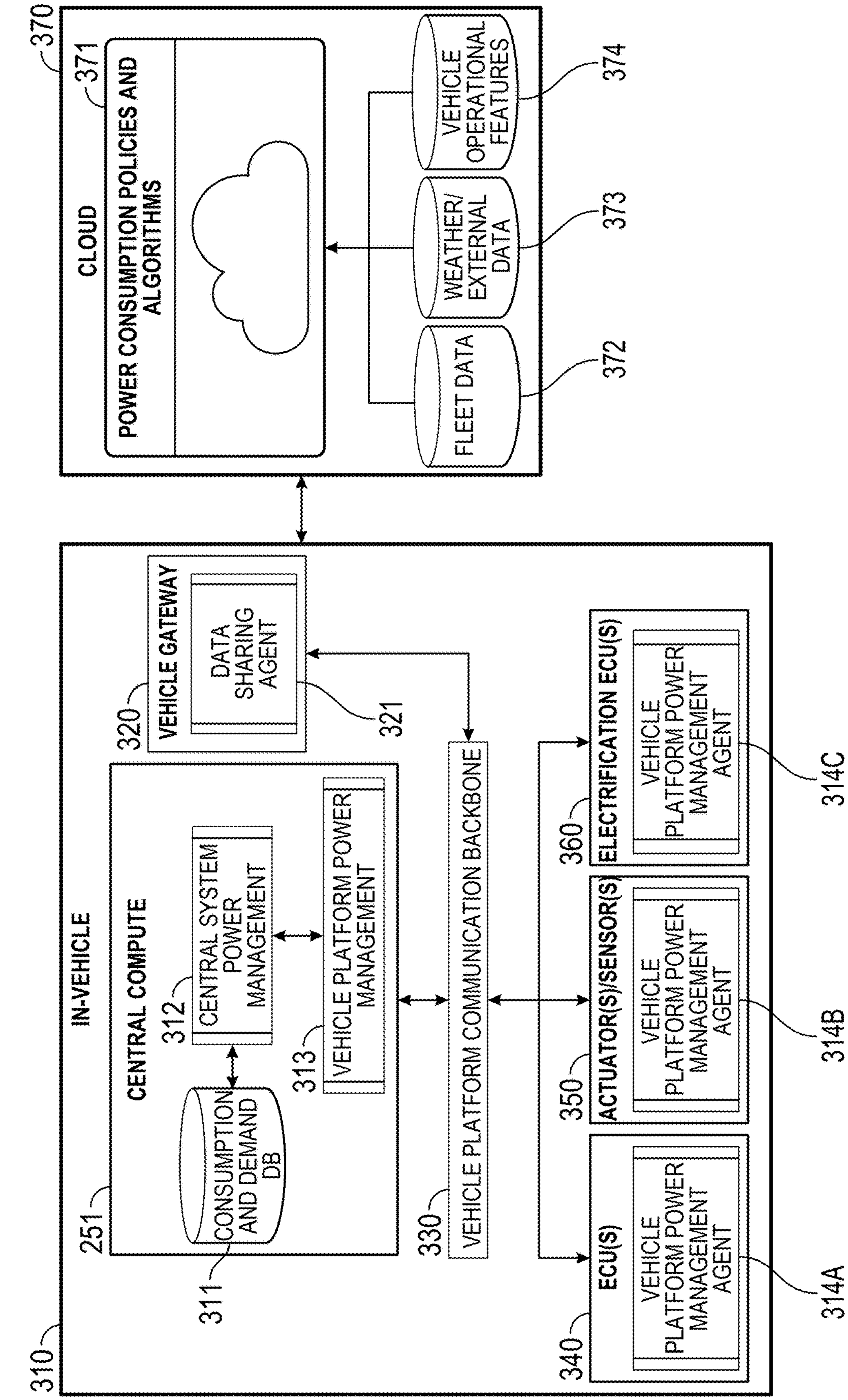
FIG. 3 depicts a schematic of an example vehicle platform power management system, according to an example.

FIG. 3 depicts a schematic of an example vehicle platform power management system, extending in-vehicle operational components (at Vehicle Platform 310) and cloud operational components (at Cloud Platform 370). An implementation of a vehicle platform power management system specifically introduces software components (agents) that are distributed within the Vehicle Platform 310 to allow a central system (the Central Compute node 251) to manage the power distribution of all components in a holistic manner. The vehicle platform power management system also obtains information from the Cloud Platform 370, which can provide real-time information relevant to the context of a given vehicle for improved power management.

The vehicle platform power management system that is depicted in FIG. 3 utilizes a combination of existing hardware components, as extended with a cloud infrastructure. The vehicle platform power management system also adds several software components while adapting existing software components for interoperability. The addition of software components is introduced in the following paragraphs, and followed by adaptations and use of hardware components.

A first added software component is a Vehicle Platform Power Management (VPPM) subsystem 313. The VPPM subsystem 313 is the main interfacing mechanism to the Central Compute node 251 that provides the semantics to describe the hardware components of the vehicle platform and the power management capabilities, features, and dependencies. This semantics is realized as a set of data structures (e.g., implemented as tables and/or databases) used to enumerate the devices and ECUs during a discovery or update mechanism, along with their capabilities, such as current and supported power states, state-change latencies, wakeup characteristics, etc. As such, the implementation of this interface is operating system-independent, hardware design agnostic, and defined with a high degree of interoperability, extensibility, and flexibility. This ensures seamless integration for efficient power management across different vehicle topologies, hardware, operating system, and platform implementation within the vehicle.

A second added component is the Central System Power Management (CSPM) subsystem 312. The CSPM subsystem 312 is a component of the Central Compute node 251 that leverages the interfaces of the VPPM subsystem 313 to define and manage power policies at the vehicle level (in Vehicle Platform 310). The CSPM subsystem 312 is responsible for making informed decisions about power state transitions, considering vehicle energy consumption information, system policies, user preferences, safety considerations, and device specifications. The CSPM subsystem 312 also has the capability to instruct ECUs and devices to power down to preserve energy. This is done while adhering to Quality of Service (QoS) and usability goals imposed by the vehicle components' operating conditions without compromising safety.

The CSPM subsystem 312 also acts as the power policy owner and coordinates the power management at the vehicle level (in Vehicle Platform 310). This is coordinated by gathering information and accessing the supported power states listed in the tables of the VPPM subsystem 313, while consistently identifying the optimal power state for the devices and ECUs. The optimal power state for a device or ECU is the one that minimizes power consumption in line with its usage requirements, such as wake-up requirements and deterministic behavior for power state transitions. The implementation of the CSPM subsystem 312 may also include redundancy mechanisms in case of failure of the Central Compute node 251. For example, a minimal implementation of the CSPM subsystem 312 could be installed in another zonal controller acting as a redundant hardware component (e.g., that takes over in case of hardware or software failure in the Central Compute node 251).

A third added component is provided by the VPPM agents. The management and execution of power policies are realized via functions and methods implemented by the CSPM subsystem 312, running on the Central Compute node 251, and by each vehicle component that supports dynamic power management (the VPPM Agents). Examples include VPPM agent 314A implemented in ECUs 340, VPPM agent 314B implemented in actuators or sensors 350, or VPPM agent 314C implemented in Electrification ECUs 360. The main role of a VPPM agent on a vehicle component (within the Vehicle Platform 310) is to be able to describe the device's characteristics, obtain their current power-related information, and execute a given power policy dictated by the CSPM subsystem 312 or when device-specific conditions occur.

The interfaces defined by the VPPM subsystem 313 enable different classes of vehicle components (e.g., ECUs, high performance computers (HPCs), Sensors, etc.) to communicate with a central hub (e.g., the CSPM subsystem 312) for describing their power management capabilities. Then, the distributed software agents (e.g., VPPM Agents) carry out the power management directives by the central system that is constantly monitoring and optimizing the power at the vehicle platform level.

Once a decision to change the operating power state (e.g., ON, OFF, Sleep, Stand By, etc.) is made for a specific device, the CSPM subsystem 312 communicates this decision to the specific device, such as via a method that sends a message over the automotive ethernet network. The specific device receives the new policy message, interprets the policy message, and executes the policy at the physical level (e.g., to turn off the device completely, put the device to sleep, or throttle down its processing frequency). If the policy was successfully executed, then the device sends a confirmation or an error message back to the CSPM subsystem 312. Additionally, an ECU or sensor can also start a power state transition as defined by its internal normal operating conditions and safety requirements. For example, a power state transition can be triggered if the internal temperature of an ECU has passed a safety threshold, forcing an internal mechanism that puts the ECU into a sleep mode. In this case, the VPPM agent will report this change back to the CSPM subsystem 312 for consistency purposes (e.g., as detailed in FIG. 4).

Figure 4:
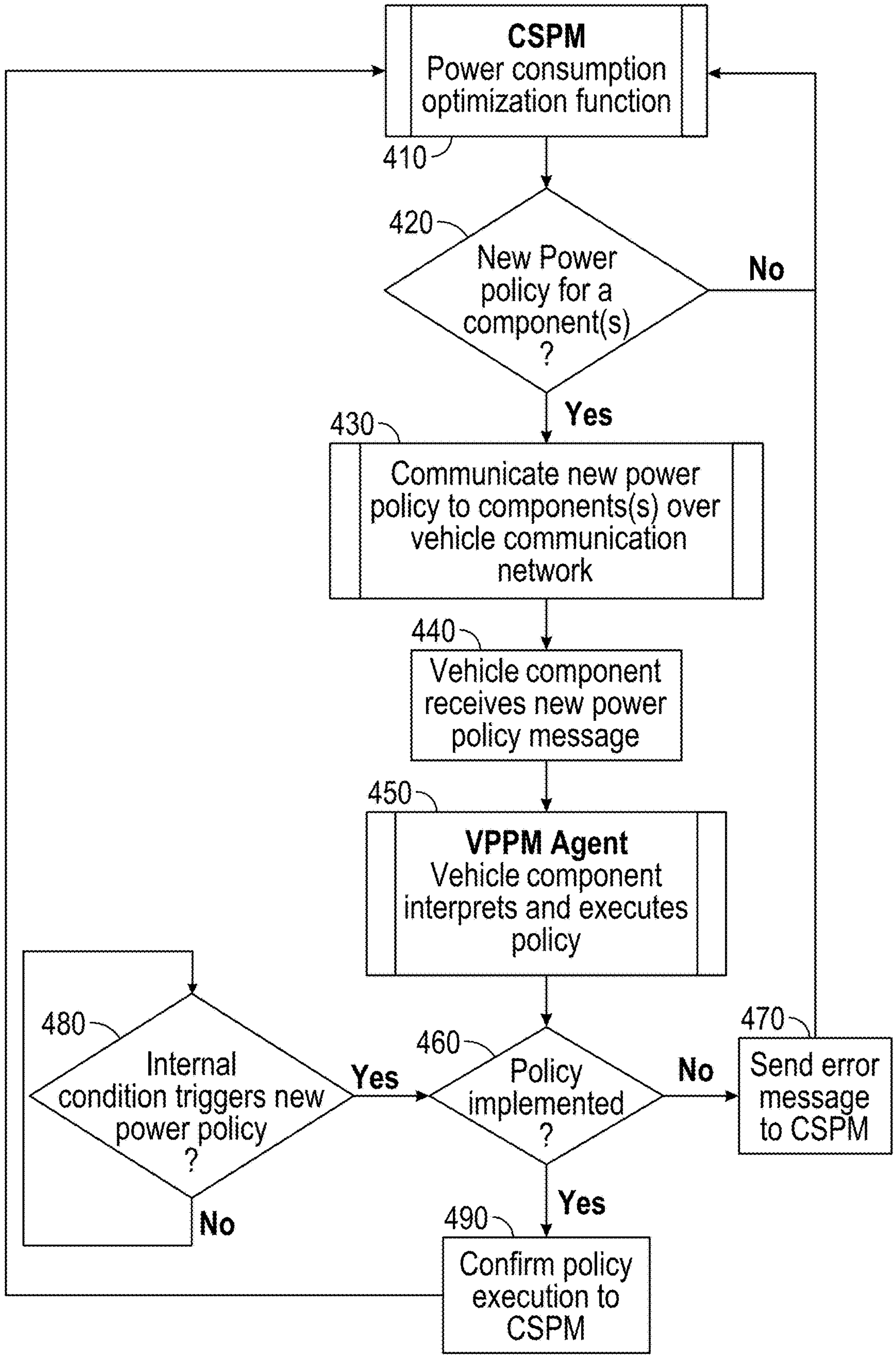
FIG. 4 depicts a flowchart of an operational flow between a function of a central system power management subsystem and a vehicle platform power management agent, according to an example.

FIG. 4 depicts a flowchart of an example operational flow between a function 410 of the CSPM subsystem 312 and a particular VPPM agent 450. First, a determination is made at decision 420 whether a new power policy is defined for one or more component(s). If a new power policy is defined, then the new power policy is communicated at operation 430 to the respective components, over the vehicle communication network (e.g., vehicle platform communication system 330).

At operation 440, the component(s) receive the new power policy message. The VPPM agent 450, operating at each component, interprets and executes the new policy. An evaluation is made at decision 460 whether the policy is successfully implemented. If not successfully implemented, then an error message is sent to the CSPM subsystem 312 at operation 470. If successfully implemented, then a confirmation message is sent to the CSPM subsystem 312 at operation 490. If an internal condition at the VPPM agent 450 triggers some new policy or policy change, as determined by decision 480, then the evaluation of the policy implementation is repeated at decision 460.

It is worth noting that the VPPM Agent on this system can be complementary to existing power management resources, as the main purpose of this VPPM Agent is to provide a layer of abstraction between a centralized power management system and the physical layer of the HW. For example, a VPPM Agent on an ECU that implements Autosar's State Manager can act as a translator between the power directives sent by the CSPM (e.g., "transition to Deep Sleep power mode") and the ECU's Autosar Runtime Environment that is the one interfacing with the ECU's physical layer.

Returning to FIG. 3, a fourth added component is provided by an Energy Consumption and Demand (ECD) database 311. This provides a local database that stores the vehicle's power consumption-related information. The ECD database 311 includes information about the status of vehicle components and the power policy assigned to each one of them. Moreover, the ECD database 311 can contain different "power mission profiles" with different power policies already defined by the vehicle manufacturer. This database is where the CSPM stores all the information relevant for dynamically optimizing power utilization, allowing the vehicle to adjust its power consumption based on real-time demands and conditions.

A fifth added software component is provided by a Data Sharing Agent 321. The Data Sharing Agent 321 will provide and receive relevant information to/from a Cloud Platform 370. The Data Sharing Agent 321 includes data policies for when to upload power-related data to the Cloud Platform 370 and when to request certain information for better power optimization. For example, the Data Sharing Agent 321 can have a policy that pulls weather-related information from a cloud service (e.g., with weather/external data) every 10 seconds as the vehicle drives around. This information can then be stored in the ECD database 311 and consumed by the CSPM as it constantly optimizes the energy consumption at the vehicle level. Additionally, this Agent has the role of backing up periodically the information gathered by the VPPM Subsystem about vehicle components' power characteristics and consumption status, so that in the case the hardware where the CSPM and VPPM Subsystem are hosted fails or there is a software failure, a backup retrieval process can be activated to allow the vehicle platform to continue with its power monitoring and management.

The hardware components used in the vehicle platform power management system include the following. First, the Central Compute node 251 in this system is considered to be, from a functionality perspective, the main compute node in the vehicle. Its primary function is to be the host hub of the CSPM subsystem 312 and VPPM subsystem 313 to monitor and manage the power usage at the vehicle level while also communicating power management strategies to ECUs and devices connected throughout the vehicle's network. In an example, within the Central Compute node 251, the CSPM subsystem 312 runs as an OS service while the VPPM Subsystem is implemented as firmware.

Next, the various vehicle components (e.g., ECUs 340, Actuators and Sensors 350, Electrification ECUs 360) are adapted to implement power control via the software agents. The hardware in the ECUs and devices specifically will execute the power policies as directed by the CSPM subsystem 312. Additionally, ECUs and devices can have the ability to be discoverable by the VPPM subsystem within the Central Compute node 251, as well as the ability to describe themselves so that the CSPM can then define and apply power policies at the vehicle level. At a high level, the ECUs and devices should be able to describe their capabilities, the power states they support, any dependencies they may have, and relevant information about context preservation when transitioning to a different power state.

Next, a Vehicle Gateway 320 is adapted for connectivity. The Vehicle Gateway 320 functions as the main point of connection with the external world, by establishing connectivity with a cloud platform where the CSPM subsystem 312 can obtain contextual information relevant to inform the vehicle power policies. This could include weather data, traffic status, EV charging stations nearby, etc. based on current vehicle location as well as any other relevant fleet-wise data crowdsourced from other vehicles.

The cloud components used in the vehicle platform power management system can provide the following features. First, the cloud may provide Power Consumption Policies and Algorithms 371. The vehicle platform power management system also relies on connectivity to the Cloud Platform 370 that includes algorithms and mechanisms for developing and deploying improved power management decision algorithms that are trained using broader factors such as traffic conditions, weather, and the collective behavior of fleets of vehicles, leading to more efficient and intelligent power utilization across all connected vehicles.

The cloud components used in the vehicle platform power management system can also include Vehicle Databases (e.g., Fleet Data 372, External Data 373, Vehicle Operational Data 374). The vehicle databases store all contextual information about the vehicle power management status as well as fleet data that can be utilized to improve the decision making in the CSPM subsystem. Accordingly. the Cloud Platform 370 operates to gather and store multiple sources of data related to the vehicle functioning, such as weather information, vehicle operational features (e.g., hardware topology information, software components' version, and all the data gathered by the VPPM subsystem 313), and fleet data collected from other vehicles. This data can then be correlated and used as input to algorithms to better develop power management policies as well as to provide real-time contextual information to the CSPM subsystem for better in-vehicle power policies.

These components in combination can provide various aspects of a vehicle-platform power management system, where the dependencies between vehicle subsystems (e.g., between the central compute node and ECUs) must be considered holistically in order to achieve power savings that can significantly improve a vehicle's efficiency. In other examples, adaptations of the central compute node may be provided. For instance, the functionality and operational components of the Central Compute node discussed herein (e.g., the VPPM, the CSPM, etc.) could be implemented in part or in whole by an ECU, Zonal Compute unit, or other compute hardware inside a vehicle. Thus, in some scenarios, the VPPM and CSPM do not reside on the Central Compute node itself, especially in vehicle architectures that do not directly include a dedicated Central Compute node.

Figure 5:
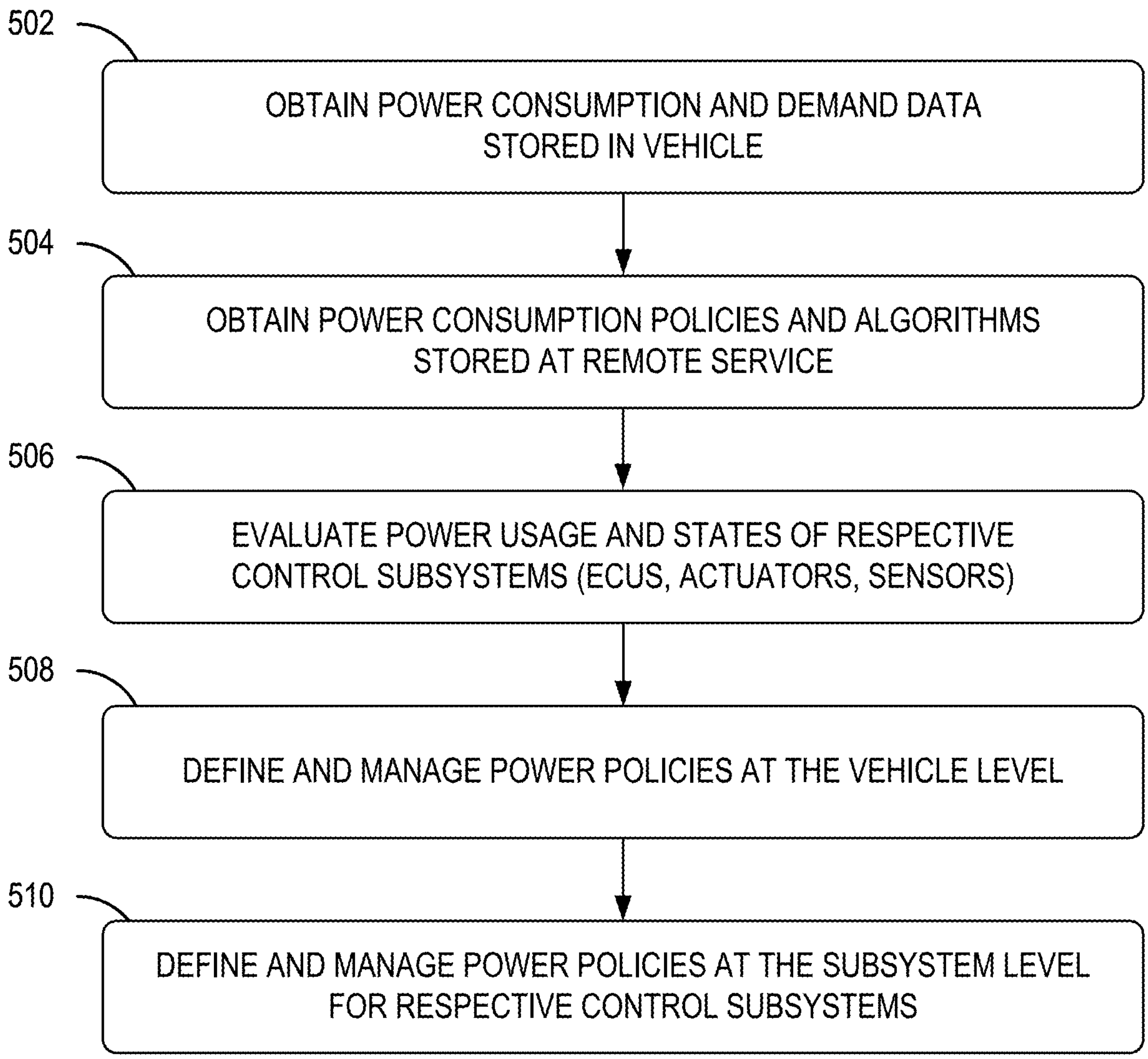
FIG. 5 depicts a flowchart of operations for configuring power management functions within a central compute node of a software-defined vehicle, according to an example.

FIG. 5 depicts a flowchart of example operations for configuring a power management functions within a central compute node of a software-defined vehicle.

At operation 502, power consumption and demand data, which is stored in the vehicle, is obtained. This may include the retrieval and analysis of data from the ECD database 311.

At operation 504, power consumption policies and algorithms, stored at a remote service, are obtained. This may include the retrieval of the policies and algorithms 371 from the Cloud Platform 370, which is based on Data 372, 373, 374.

At operation 506, power usage and states of respective control subsystems (ECUs, actuators, sensors) are evaluated by the CSPM subsystem 312.

At operation 508, power policies at the vehicle level are defined and managed by the VPPM subsystem 313.

At operation 510, define and manage power policies at the subsystem level (for respective control subsystems) are defined and provided among the VPPM agents, such as agents 314A, 314B, 314C.

Additional aspects of power management and vehicle control can be implemented with the use of vehicle topology. With the following approaches, a system can generate a semantic representation of a vehicle topology using element descriptors in ECUs and Devices. These element descriptors can be analyzed and aggregated via a central management engine in a host discovery ECU. Each ECU or device describes its capabilities, functions, power modes (wake and sleep methods, power consumption, timing, etc.), dependencies (subscriber and publisher), and optional signals that are relevant to generating an ontology to create vehicle power policies that are scalable with SDV features, shift-left Virtual Development Environment ambitions, and future feature upgradability. The element descriptor file for each ECU or device is machine readable for code generation.

This approach for a vehicle topology provides an improved outcome for a "system of systems" deployment of SDVs and other vehicle architectures. This assists scenarios where vehicle power policies are incorporated into an SDV architecture via a machine readable editable file that is used to produce code. Further, as new vehicle features or power policies are developed, they can be deployed and relevant dependencies can be quickly understood and mapped from the topology. The use of the topology also enables AI insights and visual development environment capability to be added with simplified integration.

This approach for a vehicle topology also provides additional technical benefits, by leveraging the element descriptors to describe any behaviors for functional safety, cyber security, or networking QoS requirements. This can ensure that the power policy is deployed (or other policies are deployed) without compromising these requirements. An example system, discussed below, uses node and network dependencies described in the ECU and device descriptor data to generate a tree-like structure for the vehicle topology. This tree-like structure describes the state dependencies, state machines, and behavior of the vehicle subsystems and other consumer-producer relationships of vehicle workloads.

This methodology provides a baseline for enabling the semantic representation of the "system of systems" by expanding the minimum dependency data that is used in the VPPM Agent descriptor table, enabling the build of the tree like structure. The power policies are also enhanced due to the pre-mapped Functional Safety, Cyber Security, or Quality of Service requirements for each component. In contrast to this approach, with existing systems, Vehicle ECU topology is manually drawn out using visualization tools such as Visio or system modeling software, and all communication and power management is hard coded through a cascade of requirements by the OEM. These requirements flow to the hardware and software design within the ECU or device with further decomposed requirements and validation/verification tasks.

Vehicle power policies are domain or ECU specific and typically based on vehicle power state, not feature states (e.g., a feature being off might still have the ECU operational while in Engine Run mode). The entire process is labor intensive in requirement capture and hardware/software design while it also requires multiple verification/validation steps along the way to validate that the wiring and power modeling are correct (e.g., white and black box tests, harness verification, bench builds, and first vehicle article verification).

Figure 6:
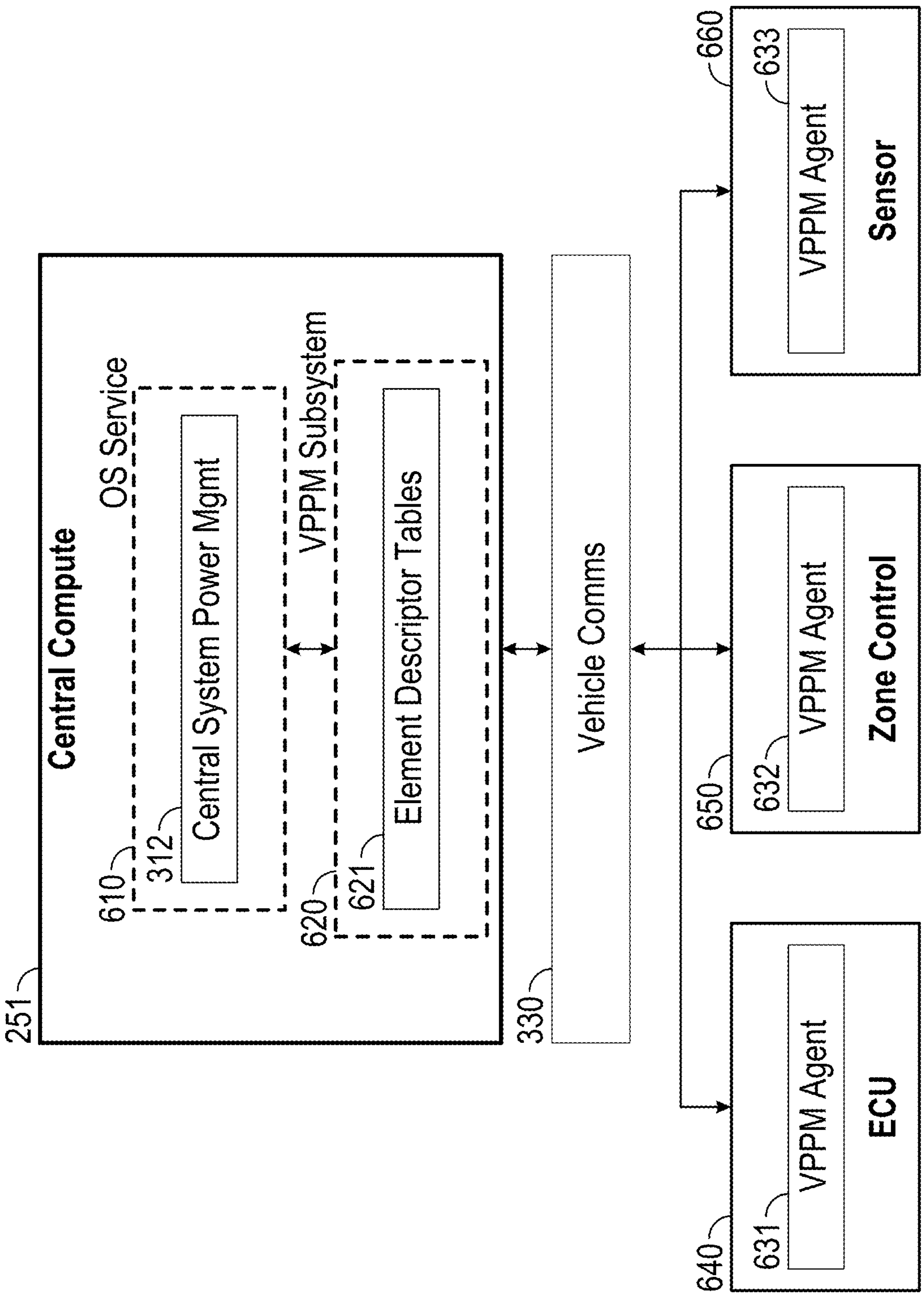
FIG. 6 depicts an implementation schematic of software components for implementation of a vehicle topology, according to an example.

FIG. 6 depicts an example implementation schematic of where these software components reside, relative to a J3311 Overview of Components. This example introduces three elements to build an implementation of a vehicle topology. First, a VPPM subsystem 620 is adapted to identify and control the VPPM Agents (e.g., agent 631, agent 632, agent 633) with element descriptors. Second, a central system power management engine 612 in an OS service 610 is adapted with an element descriptor table, and includes software to compile and build the semantic representation ontology of the system of system vehicle topology.

The CSPM subsystem 312, Element Descriptor Tables 621, VPPM Agents, and element descriptors may be provided in compliance with SAE J3311—Vehicle Platform Power Management, a work in process standard.

Each operational component of the vehicle, such as an ECU 640, zone control 650, and sensor 660, includes a VPPM agent (such as agent 631, agent 632, agent 633). The VPPM agent is designed to host the element descriptor file. In an example, the element descriptor is a text or editable file that is loaded into every ECU or device in the vehicle system. The file contains the necessary data to describe the ECU or device, the power state parameters, and any optional signals. This file can be pre-configured by the OEM or Tier 1 based on agreed capability requirements in a technical specification or up to the ECU (or device vendor) to define per J3311 guidelines.

An example of an element descriptor file content for a VPPM agent is shown in TABLE 1 below. The enablers for the semantic view of the system include the OEM pre-configured Component address and ID, the workload consumer and producer dependencies component ID(s), and the relevant communication interfaces and Node ID.

TABLE 1

| Static Data | |
|---|---|
| Component Address | E.g., IP or CAN physical address |
| Component ID | E.g., Released part number or address depending on interface specification |
| Component Name | E.g., Released component name |
| Component Type | E.g., ECU or sensor |
| Overall ASIL Rating | |
| VPPM Agent SW Version | |
| Wakeup method | E.g., Wake on LAN packet, discreet I/O |
| Wakeup Timing | E.g., time to first message |
| Sleep method | E.g., how to initiate sleep |
| Sleep Timing | E.g., time to sleep |
| Power State ID [E0 . . . E2], [D0 . . . D2] | E.g., ECU or device power state also used to build a hierarchy in CSPM table, such as E0_0ComponentID |
| Transition Time | E.g., Time to enter power state |
| Context Preservation Dependency | E.g., does any memory need preservation if entering low power modes |
| Power Consumption | E.g., characterized or measured watts |
| Performance Level | E.g., impact to performance level, such as reduced CPU clock |
| Feature Name | E.g., ECO mode |
| Function Name | E.g., dampen torque request curve |
| ASIL Requirement | |
| QoS Requirement | |
| CyberSecurity Requirement | |
| Workload Consumer Dependencies | E.g., similar to subscriber nodes, includes sensor and actuators with any prerequisites |
| Component ID(s) | E.g., List of IDs from respective element descriptor including slave devices without TX/RX capability |
| Communication Interfaces, Node ID | E.g., HSCAN or 1000BaseT1 and the Node ID to build CSPM graph table |
| Power State ID | E.g., Couples the power policy dependence between components |
| Power Passthrough, Device Dependencies | E.g., power over coax to rear camera or external relay control for non-smart device |
| QoS Requirements | |
| Workload Producer Dependencies n | E.g., similar to publisher nodes, includes sensor and actuators with any prerequisites |
| Component ID(s) | |
| Communication Interfaces, Node ID | |
| Power State ID | |
| QoS Requirements | |
| **Dynamic Data** | |
| Optional Signals | E.g., to be output at power up to VPPM Subsystem for CSPM visibility for future capability |
| Hardware Age | |
| Key cycles | |
| On time | E.g., can be broken down to on time in different power states |
| Off time | E.g., if available |
| Health Metrics over time | E.g., factory vs current measurement difference |
| Avg Voltage | |
| Avg Current | |
| Temperature | |
| Impedance | |

The CSPM subsystem 312 uses the information in the element descriptor file to command each VPPM agent (e.g., VPPM agents 631, 632, 633) to enable the various supported power states, after software is deployed to the vehicle that requires various vehicle power states. The VPPM subsystem 620 transmits the content of the element descriptor table, via the vehicle network interface of the vehicle platform communication system 330 (e.g., HS CAN, CAN-FD, 100BaseT1, 1GBaseT1, 10GBaseT1, and other networking embodiments), to the CSPM subsystem 312 software running in the Central Compute node 251. This transmission builds out the element descriptor table in the VPPM subsystem 620, operated within the Central Compute node 251; enabling the CSPM subsystem 312 to map vehicle power policies to the various ECU and device power modes.

The dependency mapping is used to create the linkage between ECU(s) and device(s) to enable interoperability. The dependency mapping is also used to prevent unintentional powering down of an ECU or device that has a functional requirement to be available while creating the vehicle power policy. Other dependencies such as Cyber Security and Functional Safety also may be incorporated.

An additional aspect of the topology is implemented within the CSPM subsystem 312. Within the vehicle system of systems, there is a discovery ECU with a central system power management software that hosts the element descriptor table portion of the VPPM Subsystem. Here, the key elements of the VPPM agents are mapped to different vehicle power policies driven by the Vehicle Power States.

The CSPM subsystem 312 uses the ECU and device dependencies including the consumer and producer component ID(s), communication interfaces, and node ID to build an ontology. The data within this mapping enables a feature or vehicle power state to be easily deployed and instantiated to only the relevant ECUs and devices. This also enables dependencies within this policy to be recognized for further capabilities or to eliminate potential conflicts or defects (for instance, turning off an ECU that provides data to another ECU for a feature that is not being turned off).

An example of a CSPM element descriptor table is shown in TABLE 2 below.

TABLE 2

| | |
|---|---|
| Vehicle Information | |
| Vehicle Identifier | E.g., VIN |
| Vehicle Platform Configuration | E.g., Vehicle E/E architecture version |
| Vehicle Make | |
| Vehicle Model | |
| Vehicle Year | |
| Vehicle CSPM Software Version | |
| Network Configuration | |
| Number of nodes | E.g., number of buses |
| Types of communication interfaces | E.g., list of HSCAN, ethernet, etc. |
| Agent Information | |
| CSPM Agent ID | E.g., creates the master Node |
| Host ECU Device ID or Address | E.g., pre configured by OEM for send and ack protocol |
| Element Descriptor Table (e.g., Creates the tree graph of other nodes - driven by number of ECUs and Devices defined below) | |
| Node ID | E.g., pre configured by OEM |
| Number of ECUs | E.g., pre configured by OEM |
| List ECU element descriptor data | E.g., Node dependency mapping and link between ECU and Devices |
| Number of Devices | E.g., pre configured by OEM |
| List Device element descriptor data | E.g., Node dependency mapping and link between ECU and devices including slave devices without TX/RX capability |
| Vehicle Power State Transition Table | |
| Vehicle Power State [V0 . . . V5] | E.g., Defines the vehicle power state from driver or telemetry inputs |
| Entry Criteria | E.g., driver or telemetry API data dependency |
| Exit Criteria | E.g., driver or telemetry API data dependency |
| Vehicle Power Policy name | E.g., repeated if user input can change power policy (such as if a button press turns a feature off) |
| Participating ECU ID(s) or addresses | E.g., pre configured by OEM - this is a list with ID and power state |
| Power State ID [E0 . . . E3] | E.g., Each ECU has a pre mapped Power State ID for CSPM to command enter from VPPM agent |

TABLE 2-continued

| | |
|---|---|
| Participating Device ID(s) or addresses | E.g., pre configured by OEM - this is a list with ID and power state |
| Power State ID [D0 . . . D2] | E.g., Each ECU has a pre mapped Power State ID for CSPM to command enter from a VPPM agent |
| Participating Nodes | E.g., used for topology and command routing |

Within TABLE 2, above, is the complete vehicle list of all component IDs and addresses broken down by each Node. This is pre-configured and easily extracted from the existing component element descriptor files. During vehicle development, the OEM system engineering team will conceptualize various vehicle power states (e.g., park, drive, city drive, highway drive, stoplight, etc.) and map these vehicle power state transitions to vehicle power policies. The vehicle power policies then map to specific ECU or Device power modes while maintaining any dependencies (e.g., cannot turn off a functional safety (FuSa) related ECU or ADAS ECU when in a certain mode).

Once the CSPM and element descriptor file are complete a semantic representation can be generated by computer software with capabilities to decode all the Node IDs, their relevant ECU and device elements and map them in an ontology. This semantic representation may be useful for visualizing and modifying multiple aspects and relationships of operational policies and power dependencies.

Figure 7A:
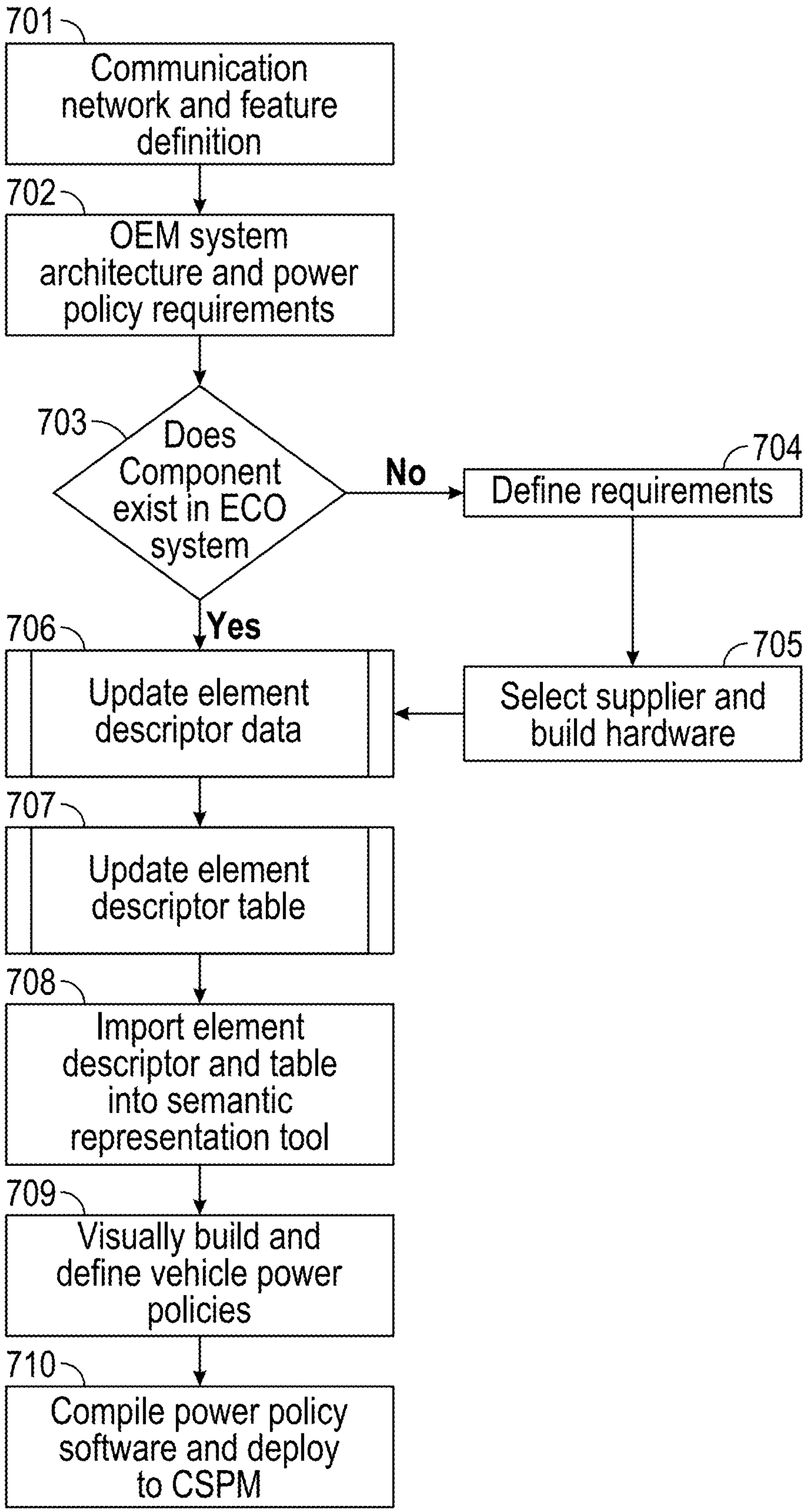
FIG. 7A depicts a flowchart for defining a topology used with a vehicle power policy process flow, according to an example.

FIG. 7A depicts a flowchart of an example sequence of defining a topology used with a vehicle power policy process. At operation 701, communication network and feature definitions are determined. At operation 702, OEM system architecture and power policy requirements are also determined.

At decision 703, an evaluation is performed whether the particular component exists in the eco system. If the component does not exist, then requirements are defined at operation 704, supplier and build hardware are selected at operation 705, and element descriptor data is updated at operation 706. If the component does exist, then element descriptor data for the component is updated at operation 706. The updated element descriptor data is then updated in the element descriptor table at operation 707.

The element descriptor data and the element descriptor table are imported into a semantic representation tool at operation 708. In this semantic representation tool, functionality is provided to enable a user to visually build and define vehicle power policies at operation 709. This tool can be used to compile the power policy software instructions, and deploy the instructions to the CSPM subsystem 312 at operation 710.

Figure 7B:
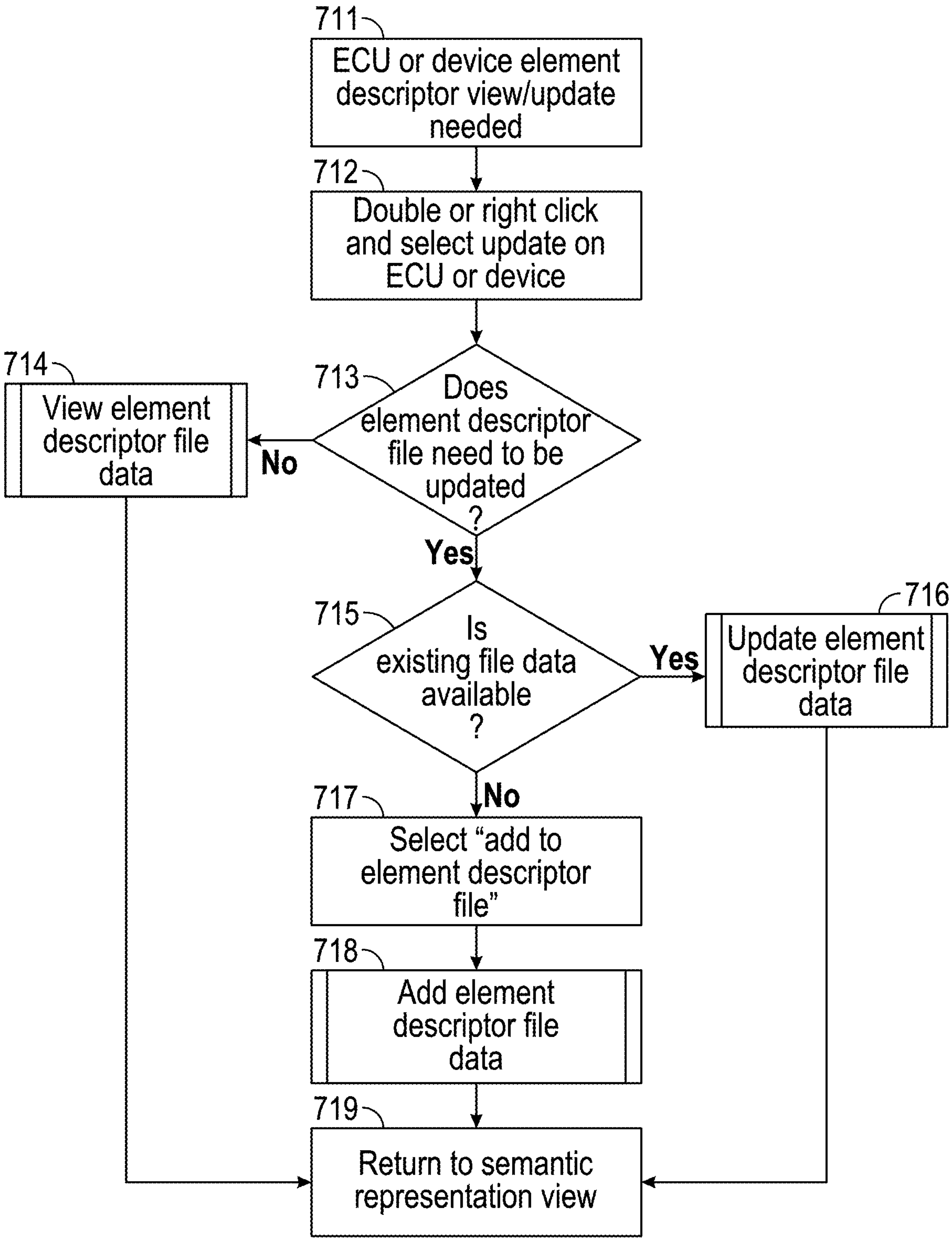
FIG. 7B depicts a flowchart for updating a topology provided in an element descriptor file, according to an example.

FIG. 7B depicts a flowchart of an example sequence of updating a topology provided in an element descriptor file. At operation 711, the ECU or device element descriptor is viewed, with an update needed to some characteristic of the ECU or device element. At operation 712, a user interacts with the element descriptor such as by double or right clicking, and instructing an update for the ECU or device element.

At decision 713, an evaluation is performed whether the element descriptor file needs to be updated as a result of the element descriptor change. If no update is needed, then the element descriptor file data is viewed at operation 714. If the element descriptor file needs to be updated, then a determination is made at decision 715 whether an existing file data is available. If the element descriptor file is available, then the element descriptor file data is updated at operation 716.

If no existing file data is available, then a user is provided with an option to select "add to element descriptor file" at operation 717. The element descriptor file data is added at operation 718. The flow concludes by returning to the semantic representation view at operation 719. Other variations in user interaction and functionality may be provided.

The communication and dependency linkage between ECU(s) and device(s) can be maintained in the semantic representation, such that any violation of dependency will result in no change to the representation (and, as appropriate, to provide an alert to the user of the tools regarding the details of violation). The semantic representation also allows the viewing and editing of each ECU or device element descriptor table, the process to view or update is shown in this figure. The tool can then output a new element descriptor file that is then released into production and stored in the ECU or device memory.

To further enhance the view, components can be organized based on the subsystem they are mapped to, within the node or the features that are supported. This classification can enable a simplified method to selectively highlight and map vehicle power policies in a visual manner. This representation also further enables a virtual development environment by preconfiguring the ontology used to create a visual system map where software modules can be loaded into the relevant ECU or device and simulated ahead of actual hardware and software integration. Further AI insights can also be integrated from the ontology showing a complete breakdown of power usage or other critical telemetry data.

Figure 8:
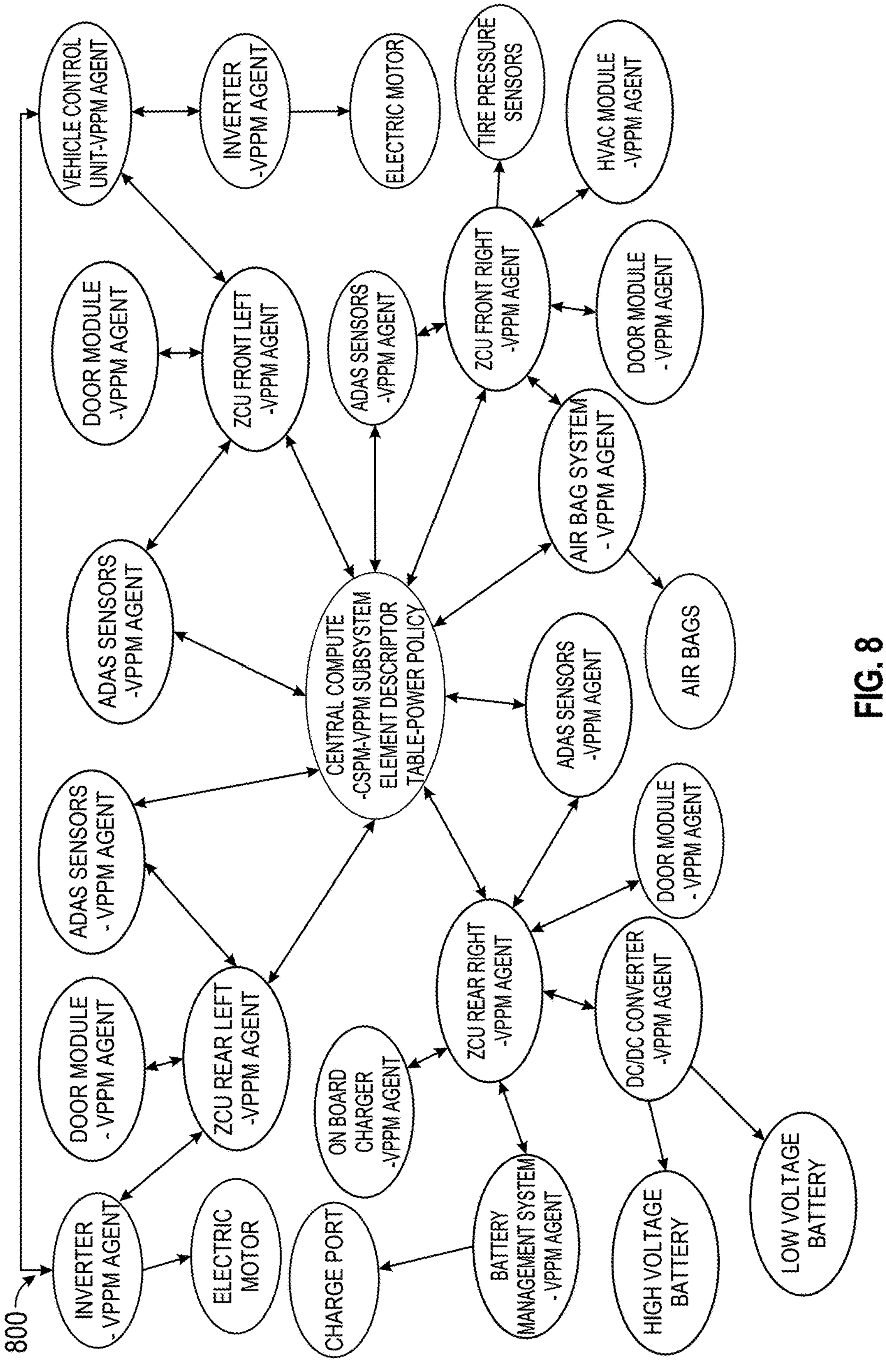
FIG. 8 depicts a semantic representation of a vehicle system of systems, according to an example.

FIG. 8 depicts an example of a semantic representation 800 of a vehicle system of systems, providing a Vehicle System of System Example Semantic Representation. Each ECU and device within a vehicle can be independently selected, or batch selected to further define individual power states per the vehicle power policy.

Figure 9A:
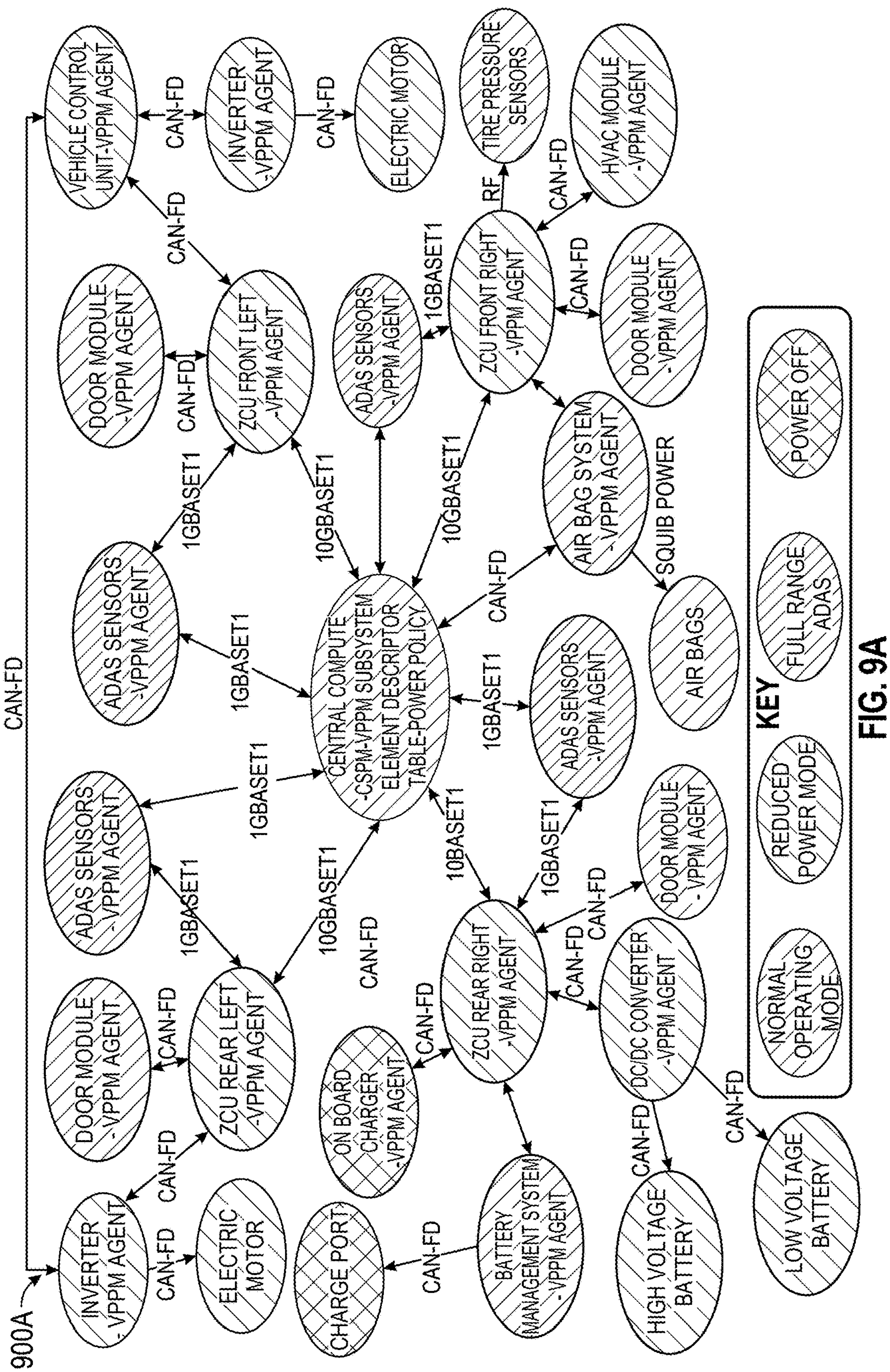
FIG. 9A depicts a semantic representation of a highway power policy, according to an example.

Likewise, FIG. 9A depicts an example of a semantic representation 900A of a highway power policy. This demonstrates an ECU- or device-specific power policy that is mapped to a highway-driving vehicle power policy. The figure also demonstrates that this control is operational over various vehicle network interfaces. When the vehicle power state machine determines that the vehicle is operating on a highway using, but not limited to only a combination of GPS, Map data, traffic sign recognition, and vehicle speed the CSPM will command power policy transitions from each VPPM Agent to realize the vehicle wide power savings.

Figure 9B:
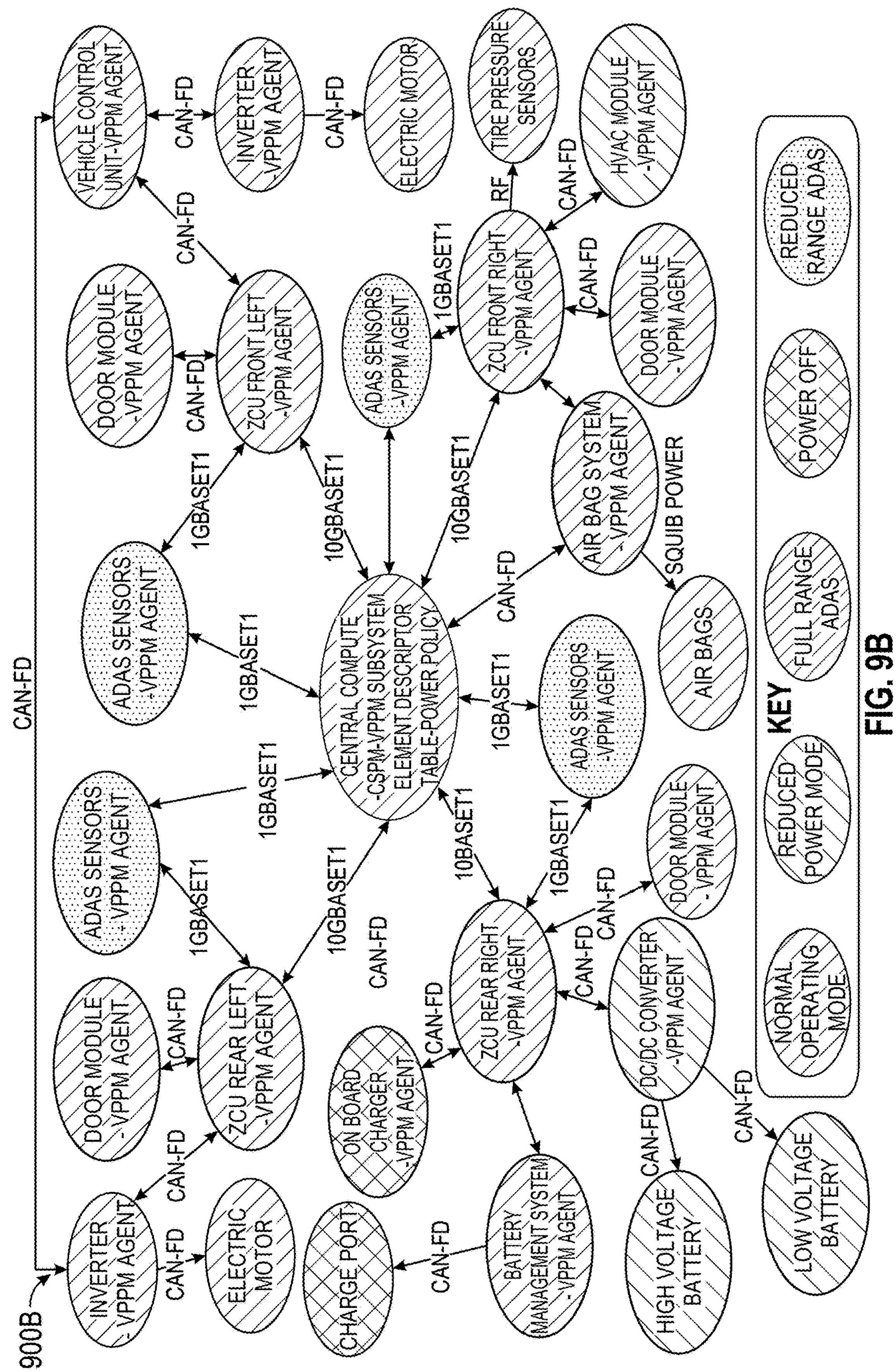
FIG. 9B depicts a semantic representation of a city power policy, according to an example.

Additional vehicle power policies can also be implemented using the semantic representation by clicking and setting the appropriate ECU or device power policy attribute. FIG. 9B depicts an example of a semantic representation 900B of a city power policy. This demonstrates various ECUs and devices that are visualized and shown with updated power states. Additional embodiments and details from each ECU or Device element descriptors (such as assigned mode power usage/performance and additional various attributes) can be visualized while the system architects are designing the vehicle power policies within the tool (e.g., providing a total system power consumption dashboard). This will aid in the mapping of ECU and Device power states to the vehicle power policy based on functional requirements at the vehicle level.

Figure 10:
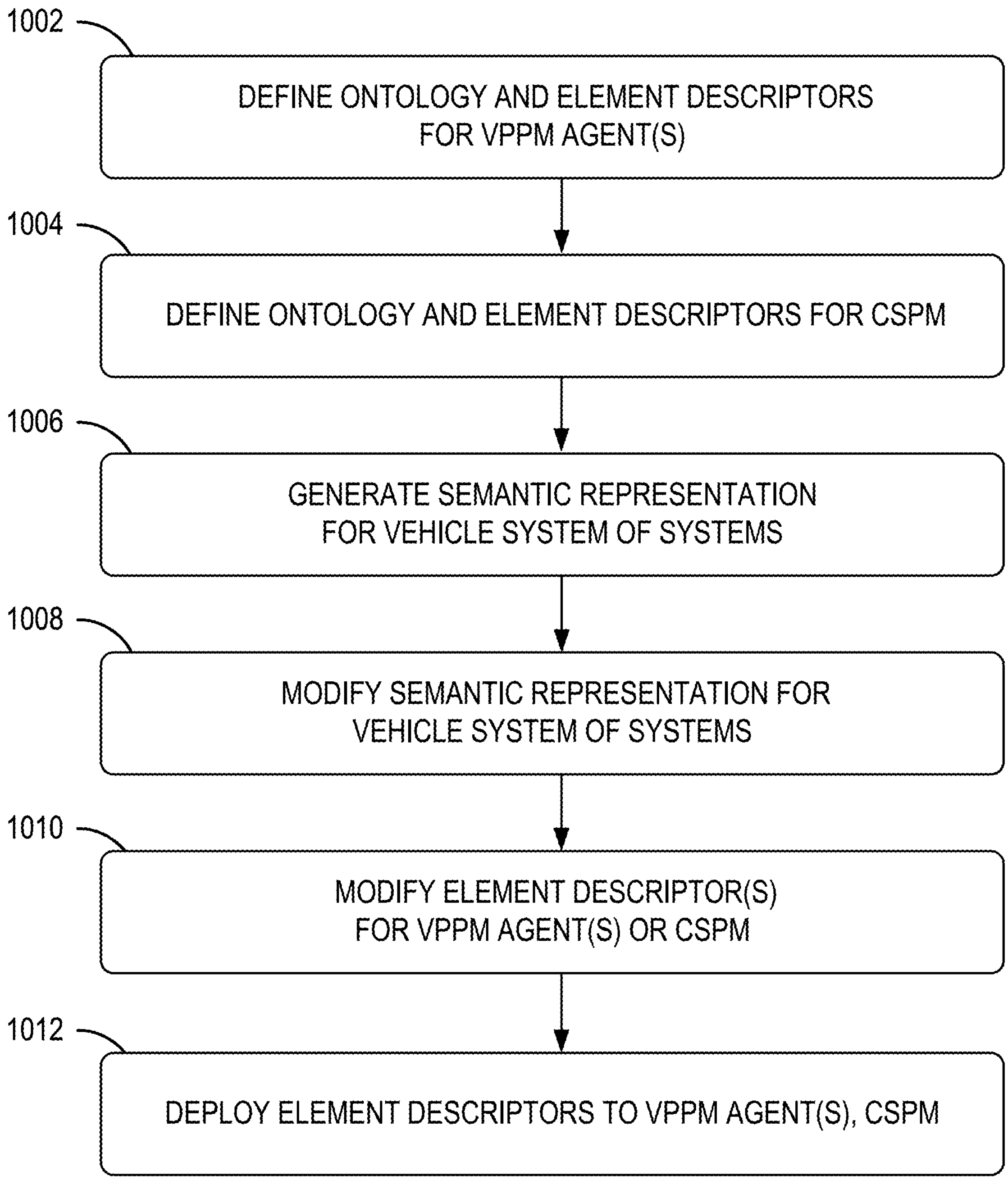
FIG. 10 depicts a flowchart of operations for establishing and deploying a vehicle power policy based on a semantic representation, according to an example.

FIG. 10 depicts a flowchart of operations for establishing and deploying a vehicle power policy based on a semantic representation.

At operation 1002, an ontology and a set of element descriptors are established for one or more VPPM agent(s).

At operation 1004, an ontology and a set of element descriptors are established for the CSPM.

At operation 1006, a semantic representation is generated for the vehicle system of systems.

At operation 1008, the semantic representation for the vehicle system of systems is modified, such as using visual tools as discussed above.

At operation 1010, the one or more element descriptors for the VPPM agents or the CSPM are modified, based on the modification of the semantic representation.

At operation 1012, the element descriptors (e.g., in the form of a new or updated element descriptor file) are deployed to the VPPM agent(s) and the CSPM.

The following section introduces additional implementations to enable dynamic workload movement in vehicles for optimized system-level KPIs. SDVs today offer a static mapping of workloads to their available computing resources. As SDVs realize their potential, the runtime environment at any given time can have a multitude of KPI outcomes that would need to be channelized based on usage scenarios and/or user preferences. This can be enabled by allowing workloads to be mapped dynamically to computing resources.

Dynamic workload mapping can enable optimization for a particular KPI of interest. For instance, the workload mapping for an optimized power profile with a certain set of compute resources, which is turned off to save power, would look very different from a high availability mapped workload profile that has redundant compute resources enabled.

The following approaches provide methods and systems that enable dynamic workload movement, as used to optimize for target vehicle level KPIs. These approaches include the creation of a vehicle topology of all compute elements and devices in a vehicle leveraging a hierarchical data structure such as an XML schema. All elements, their associated attributes, and relationships are captured in a structured data set. The compute elements use metadata to describe their type and capabilities that can be leveraged to optimize for a vehicle-level KPI and negotiate Service Level agreements or SLAs between compute engines.

Figure 11:
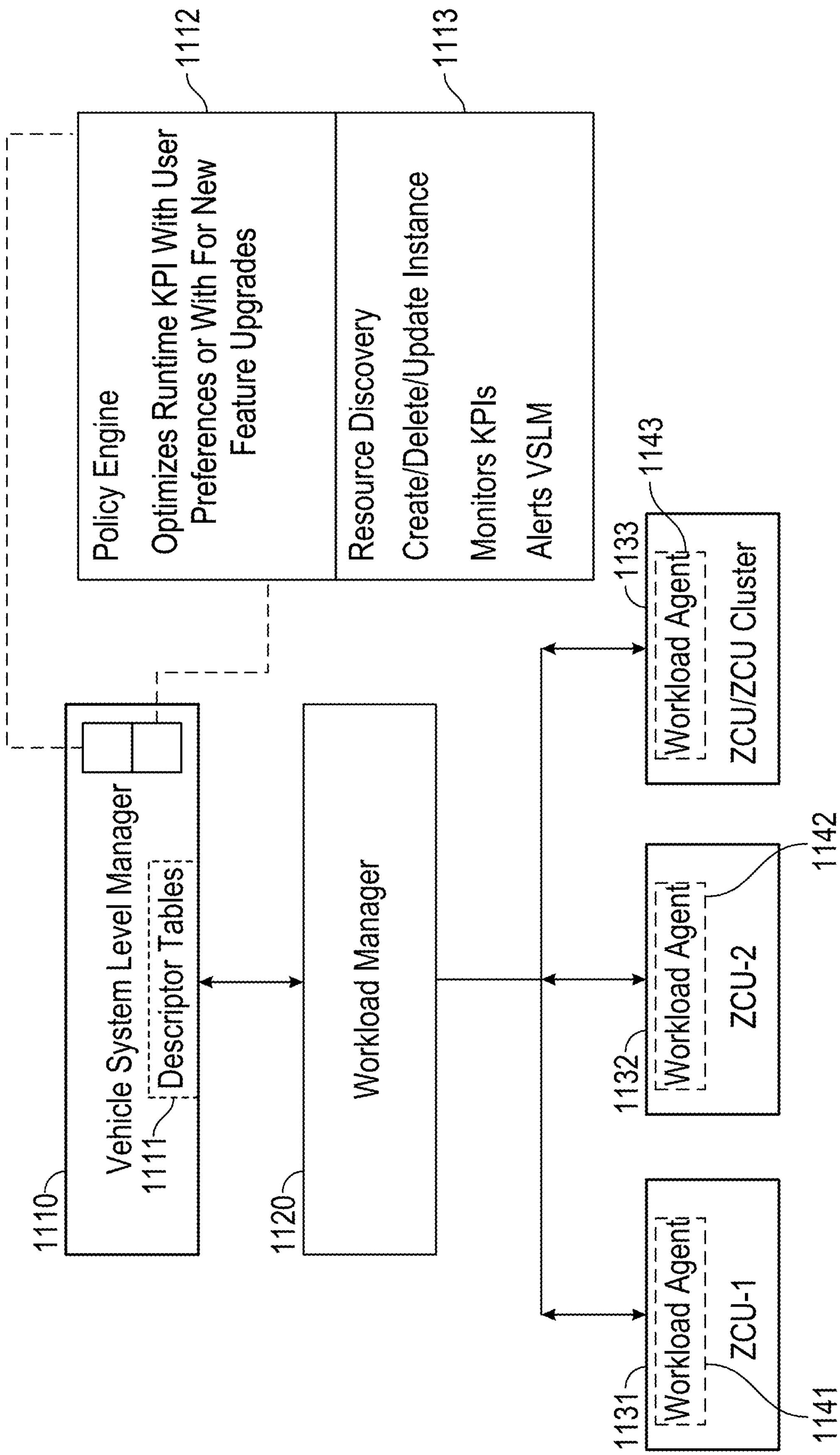
FIG. 11 depicts a vehicle topology architecture for enabling dynamic workload movement, according to an example.

FIG. 11 depicts an example vehicle topology architecture. This architecture includes a vehicle system level manager, a workload manager, and workload agents. For example, the vehicle system level manager serves as Vehicle Level Policy engine and drives Vehicle-level KPIs such as utilization targets, and power targets. The vehicle system level manager also interfaces with a Cloud Gateway (not shown) for the deployment of new functionality through CI/CD, and receives deployment commands for new feature upgrades.

A vehicle system level manager, shown as VSLM 1110, is adapted to include a policy engine 1112 and a resource discovery function 1113. The policy engine 1112 is adapted to optimize runtime KPI with user preferences, or with new feature upgrades. The resource discovery function 1113 performs operations such as to create/delete/update instances, monitor KPIs, and provide VSLM alerts.

The workload manager 1120 monitors workloads performed among control units such as ZCU-1 1131, ZCU-2 1132, and clusters of control units such as ZCUn/ZCU cluster 1133. Each of the control units implements separate workload agents 1141, 1142, 1143 to communicate with and implement instructions from the workload manager 1120.

The workload manager 1120 performs the following functions: Create/Delete/Update workload instance; monitor KPIs (e.g., to ensure target KPIs are being met); and provide alerts to the VSLM 1110 (e.g., alerts to the VSLM 1110 when Zone level target KPIs are missed, or alerts to the VSLM 1110 in case of failures).

AI Insights and digital twin capabilities may be leveraged to create and update the valid vehicle level states and profile maps, updating the vehicle's runtime environment with updated features or user demands.

Multiple types of profile maps may be used for deploying target-optimized capabilities. For instance, separate vehicle level profile maps may be provided for the following vehicle modes:

- Peak Performance (e.g., implemented with a specific Performance Profile map);
- Low Power modes (e.g., implemented with a specific Power Profile map); or
- Reliability modes (e.g. implemented with a specific Reliability Profile map); or
- Feature Update modes (e.g., implemented with a new feature update profile map)

An example of a Power Profile map, for instance, can map a fixed set of vehicle level modes to all ECU and device states as shown in TABLE 3:

TABLE 3

| |
|---|
| V_P0: ECU0_0 [DC00_0 . . . DC0N_0, ECU1_0 [DC10_0 . . . DC1N_0], . . . ECUn_0 [DCn0_0 . . . DCnN] |
| VPx: ECU0_X [DC00_X . . . DC0N_X, ECU1_X [DC10_X . . . DC1N_X], . . . ECUn_X[DCn0_X . . . DCnX] |

Where X: Power state
N: Number of Devices per ECU;
n: number of ECUs

Accordingly, vehicle level profiles that are optimized for a vehicle level KPI (e.g., based on negotiated SLAs (service level agreements)) may be established from the use of such profile maps. As noted above, a vehicle topology can be created for all compute elements and devices in a vehicle, leveraging a hierarchical data structure such as an XML schema. All elements, their associated attributes, and relationships can be captured in a structured data set. The compute elements use metadata to describe their type and capabilities and associated SLAs.

Examples of profile definitions for a Vehicle Performance Profile Map may be provided as follows in TABLE 4. In TABLE 4, P0 . . . Pn are Performance states across ECUs.

TABLE 4

| Vehicle Performance Profile Map | | | | | |
|---|---|---|---|---|---|
| Vehicle State | ECU 0 | ECU 1 | ECU 2 | ECU3 | ECUn |
| VM-Highway: Performance P0 | P0 | P0 | P0 . . . P2 | P0 . . . Pn | P0 . . . Pn |
| VM-Highway: Performance Eco P1 | P0 | P2 | P3 | P3 | P3 |

Examples of a Vehicle Power Profile Map are provided as follows in TABLE 4. In TABLE 4, C0 . . . Cn are low power states across ECUs.

TABLE 5

| Vehicle Power Profile Map | | | | | |
|---|---|---|---|---|---|
| Vehicle State | ECU 0 | ECU 1 | ECU 2 | ECU3 | ECUn |
| PowerC1-Highway | C0 | C1 | C1 . . . C2 | C0 . . . Cn | C0 . . . Cn |
| PowerC5-OTA | C0 | C1 | C1 . . . C2 | C0 . . . Cn | C0 . . . Cn |
| PowerC6-Key Off | | | | | |

Examples of a Feature Workload Descriptor, with Vehicle level state to ECU state mapping, are provided as follows in TABLE 6.

TABLE 6

| Vehicle State | ECU1 | ECU2 | ECU3 |
|---|---|---|---|
| P0 | E1P0 | E2P0 | E3P0 |
| PN1 | E1P0 | E2PN1 | E3PN1 |

Examples of a Feature Workload Descriptor, with Workload mapping per Vehicle Level State, are provided as follows in TABLE 7.

TABLE 7

| Vehicle State | ECU1 | ECU2 | ECU3 |
|---|---|---|---|
| P0 | W1, W2, W3 | W1, W2 | W1 |
| PN1 | W1, W2, W3 | W1, W4N | W1, E2W2 |

The examples above demonstrate that vehicle-level states may be mapped to individual ECU states, whereas workloads at the ECU level may be mapped to their corresponding power states.

Examples of a vehicle topology. expressed in XML format, are provided as follows in TABLE 8.

TABLE 8

```
<Vehicle Identifier>
  <Vehicle info placeholder>
  <Vehicle topology elements>
  <Vehicle Root node ID>
    <Root node Type>
    <Root node name>
    <Root node Capability 1>
      <Sub Feature 1>
      <SLA 1>
      <Sub Feature 2>
      <SLA 2>
    </Capability 1>
    <Root node Capability 2>
      <Sub Feature 1>
      <SLA 1>
      <Sub Feature 2>
      <SLA 2>
    </Capability 2>
    <Component Subsystem Description>
    <Component ID Child1>
      <Component Name>
      <Component Type>
      <Sub node Capability 1>
        <Sub Feature 1>
        <SLA 1>
        <Sub Feature 2>
        <SLA 2>
      </Capability 1>
      <Sub node Capability 2>
        <Sub Feature 1>
```

TABLE 8-continued

```
        <SLA 1>
        <Sub Feature 2>
        <SLA 2>
      </Capability 2>
    </Component child1>
    <Component ID Child2>
      <Component Name>
      <Component Type>
      <Sub node Capability 1>
        <Sub Feature 1>
        <SLA 1>
        <Sub Feature 2>
        <SLA 2>
      </Capability 1>
      <Sub node Capability 2>
        <Sub Feature 1>
        <SLA 1>
        <Sub Feature 2>
        <SLA 2>
      </Capability 2>
    </Component Child2>
    <Workload Consumer Dependencies>
      <Child Node ID(s)>
    <supported Comms>
    <Workload Producer Dependencies>
      <Parent Component ID(s)>
      <Supported Comms>
  </Vehicle Root node>
</Vehicle>
```

In this schema, workload consumer dependencies nodes can be defined to include similar properties to publisher nodes. Among other technical benefits, the schema allows OEMs to optimize across vectors that are relevant for their customer base. As SDVs transform into advanced settings (e.g., living rooms on wheels) and OEMs offer many vehicle capabilities tailored to end users, the present approaches provide systems that can quickly adapt to end user needs, and solutions involving AI and digital twin enhancements.

Figure 12:
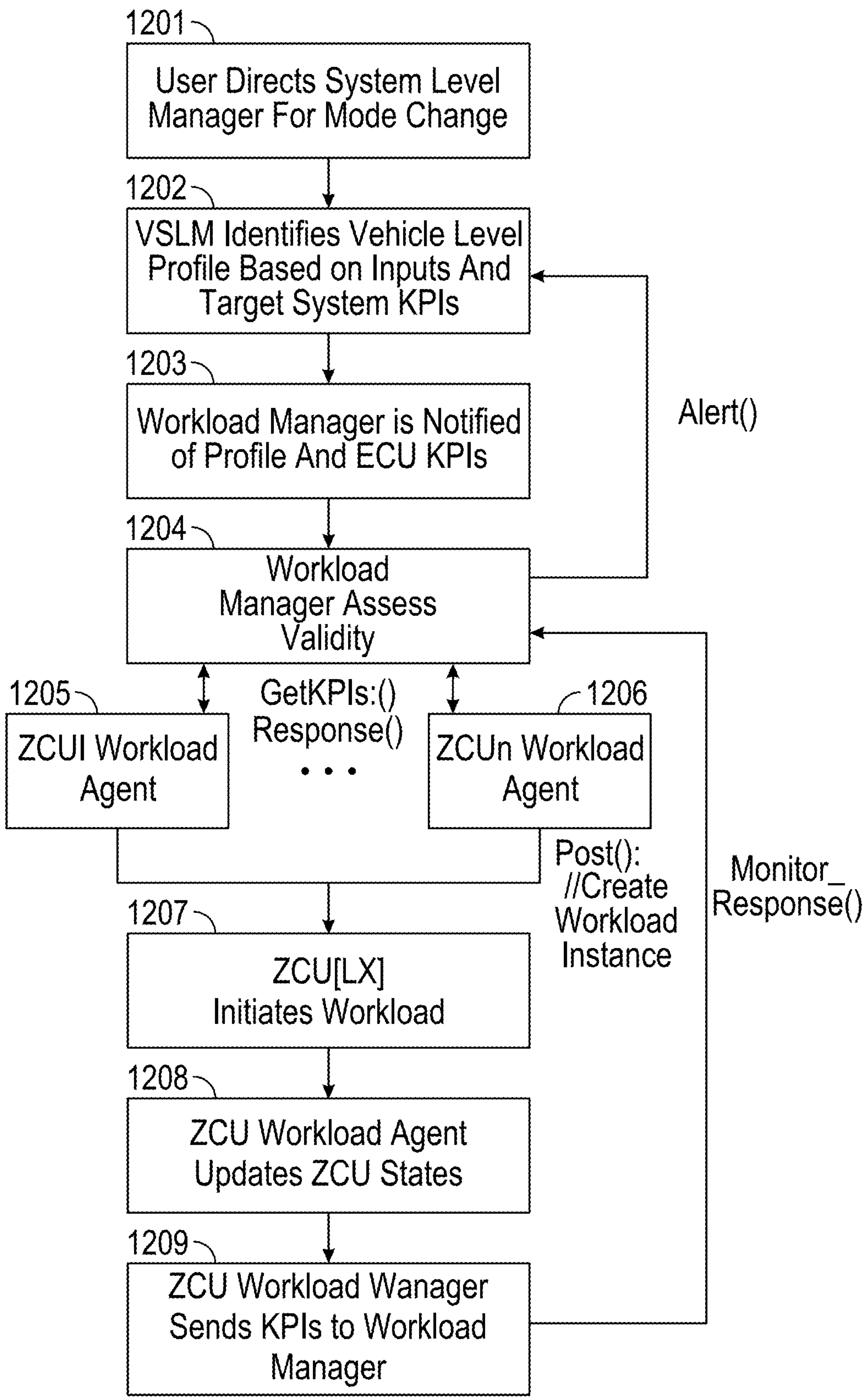
FIG. 12 depicts a flowchart of operations for implementing a vehicle topology based on profile maps, and modifying workload operations based on a mode change, according to an example.

FIG. 12 is a flowchart illustrating operations for implementing a vehicle topology based on profile maps, establishing a mapping to a profile associated with a vehicle mode, and modifying workload operations based on a mode change.

At operation 1201, a user directs the system level manager for a mode change. At operation 1202, the VSLM (e.g., VSLM 1110) identifies a vehicle-level profile based on inputs and target system KPIs. At operation 1203, the workload manager (e.g., workload manager 1120) is notified of the profile and ECU KPIs. At operation 1204, the workload manager (e.g., workload manager 1120) assesses validity of the profile. Alerts are raised, as needed, to the VSLM.

At operation 1205, the profile is deployed at a first workload agent at the control unit (e.g., ZCU-1 1131), with KPIs being provided to the first workload agent. At operation 1206, the profile is deployed at another workload agent at the control unit (e.g., ZCU-2 1132, or "ZCU-n").

At operation 1207, the respective ZCU initiates the workload. At operation 1208, the ZCU workload agent (e.g., workload agent 1141, workload agent 1142, workload agent 1143) updates ZCU states. At operation 1209, the ZCU workload manager sends KPIs to the workload manager. The workload manager 1120 continues to assess the state of the workloads, and can redistribute the workloads as needed within the vehicle.

Figure 13:
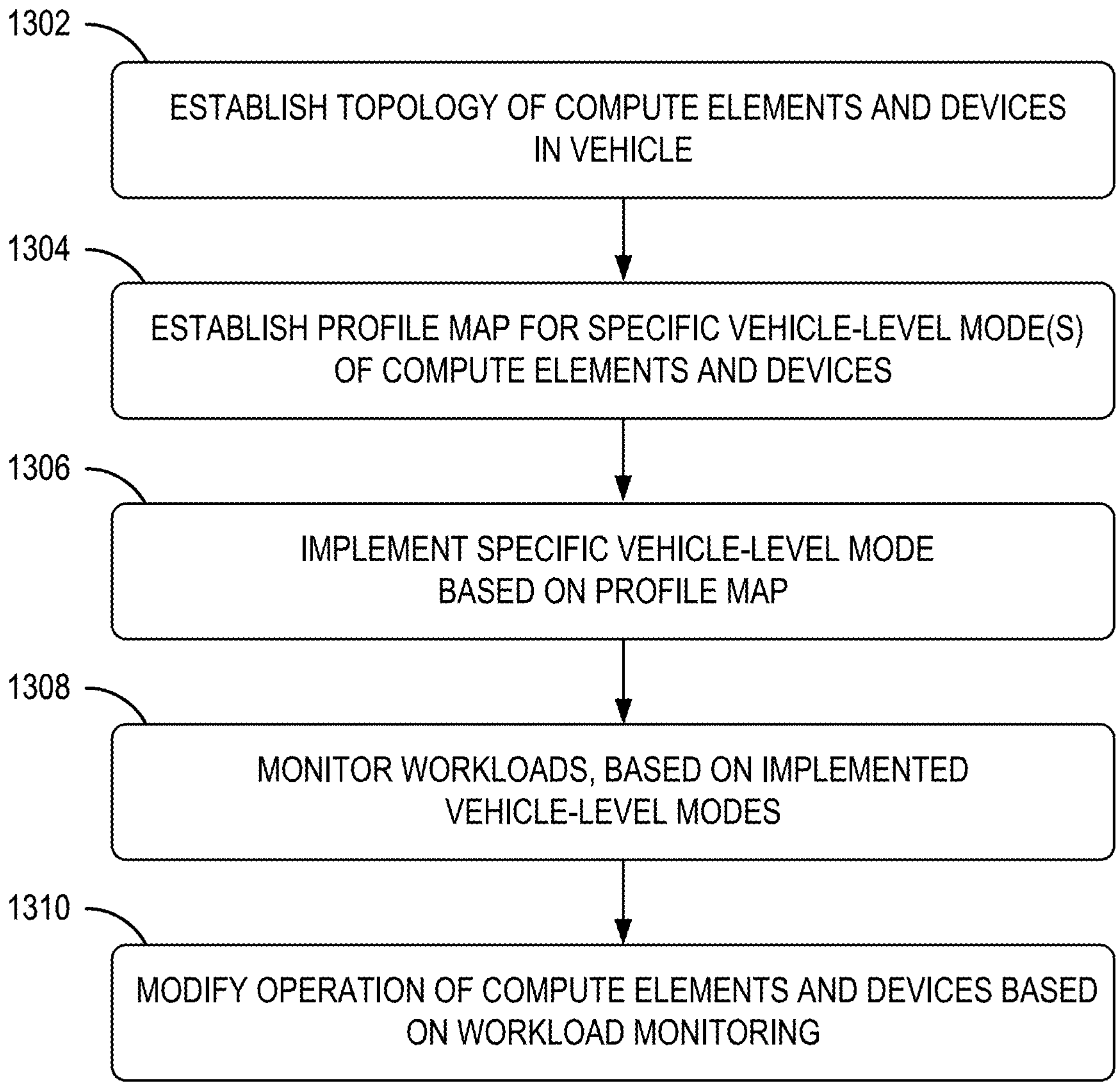
FIG. 13 depicts a flowchart of operations for dynamic workload reconfiguration based on system-level key performance indicators, according to an example.

FIG. 13 depicts a flowchart of operations for dynamic workload reconfiguration based on system-level key performance indicators, according to an example.

Operation 1302 includes establishing a topology of compute elements and devices in the vehicle. This may be performed with the semantic mapping and definition operations discussed above.

Operation 1304 includes establishing a profile map for specific vehicle-level mode(s) of compute elements and devices. These profiles may be defined for power or operational constraints, based on various operational modes as discussed above.

Operation 1306 includes implementing specific vehicle-level mode(s) in the vehicle, based on the profile map. Operation 1308 includes monitoring the execution and use of the workloads, based on implemented vehicle-level modes. Operation 1310 includes modifying operation of compute elements and devices based on workload monitoring. These operations may be performed by the workload manager 1120 and the workload agents 1141, 1142, 1143, as suggested above.

Figure 14:
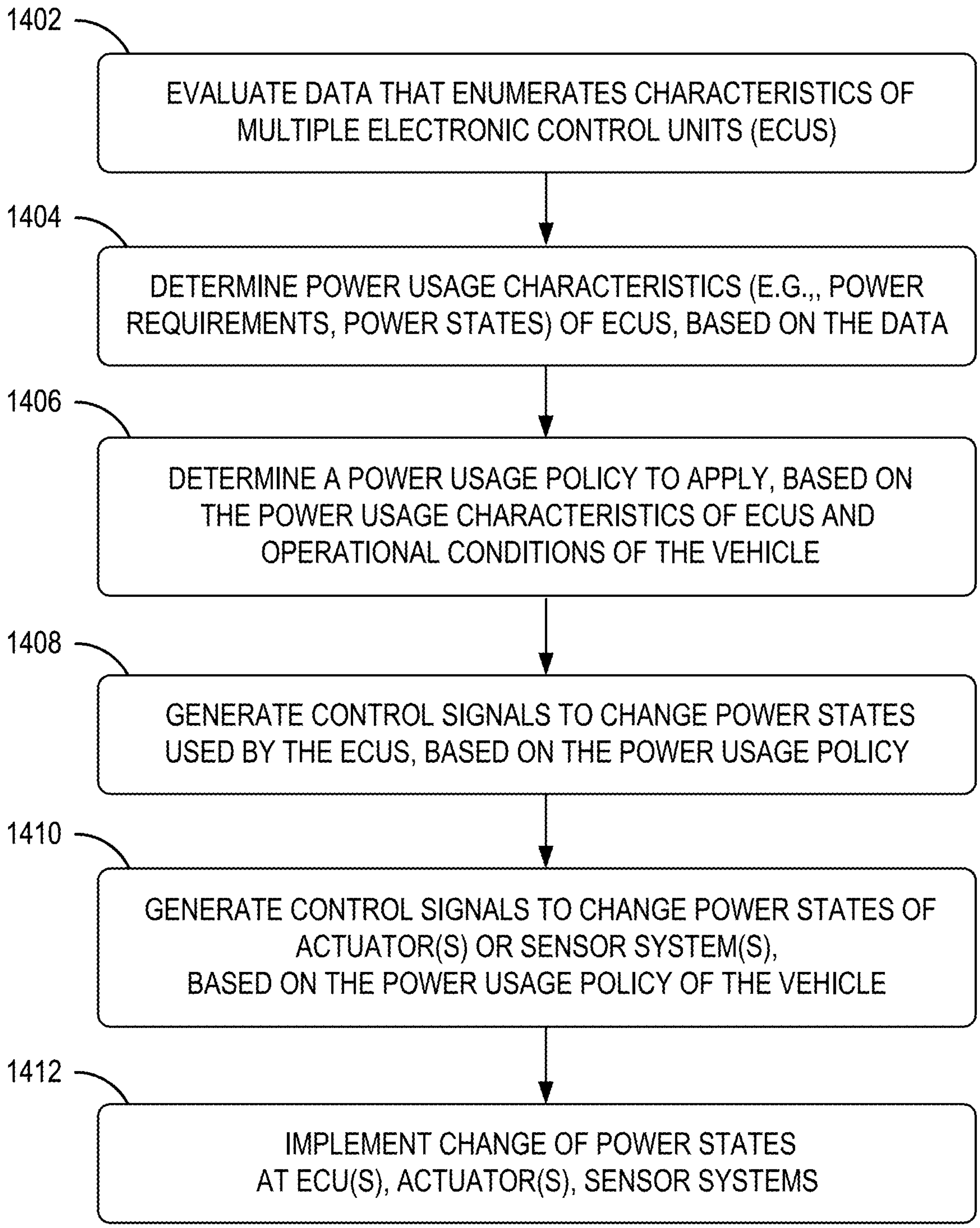
FIG. 14 depicts a flowchart of operations for establishing or operating a power management control subsystem in a software-defined vehicle, according to an example.

FIG. 14 depicts a flowchart of operations for establishing or operating a power management control subsystem in a software-defined vehicle.

Operation 1402 includes evaluating data that enumerates the characteristics of vehicle components, such as electronic control units (ECUs), sensors, actuators, or other compute hardware inside a vehicle. In a specific example, the components comprise respective electronic control units (ECUs) or zone control units.

Operation 1404 includes determining power usage characteristics (e.g., power requirements, power states) of ECUs, based on the data. In a specific example, such power usage characteristics may be monitored on an ongoing basis, recorded, or logged. Also in a specific example, characteristics of the ECUs and other components of the vehicle can be defined with element descriptors that are used to associate multiple power usage policies of the vehicle to individual power states of the respective components.

Operation 1406 includes determining a power usage policy to apply, based on the power usage characteristics of ECUs and operational conditions of the vehicle. Such operational conditions may be based on energy consumption and energy demand applicable to the vehicle.

In an example, the operations to determine the power usage policy to apply in the vehicle are performed in a central system power management function that executes in a central compute node of the vehicle. In another example, the operations to determine the power usage policy are based on external data provided by a remote service (e.g., data that relates to weather conditions, external conditions, fleet conditions, vehicle operational features, etc.). Accordingly, the power policy may be determined/produced locally at the vehicle, or remotely from a service (or another vehicle or entity).

Operation 1408 includes generating control signals to change power states used by the ECUs, based on the power usage policy. In an example, this operation to generate control signals is performed in a vehicle platform power management function (VPPM) executing in a central compute node of the vehicle (e.g., a central compute node is connected to the respective ECUs via a vehicle platform communication interface, as discussed above). In this example, the control signals may be provided from the VPPM in the central compute node to a VPPM agent executing in the respective ECUs.

Operation 1410 includes generating control signals to change the power states of actuator(s) or sensor system(s), based on the power usage policy of the vehicle. In an example, the control signals may be provided from the VPPM in the central compute node to a VPPM agent executing in the respective actuator(s) or sensor system(s).

Operation 1412 includes implementing a change of power states at ECU(s), actuator(s), and sensor systems. The change of power state may be accompanied or coordinated with the management of workload instances. In an example, the operational conditions of the vehicle and the respective components are associated with workload instances, and such workload instances are managed by a vehicle system level manager executing in a central compute node of the vehicle.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is at least one non-transitory machine-readable medium capable of storing instructions, wherein the instructions when executed by processor circuitry of a vehicle, cause the processor circuitry to perform operations to: evaluate data that enumerates characteristics of multiple components of the vehicle; determine power usage characteristics of respective components of the vehicle from the data, the power usage characteristics including power requirements and available power states of the respective components; determine a power usage policy to apply in the vehicle based on the power usage characteristics of the respective components and operational conditions of the vehicle, wherein the power usage policy includes restrictions for the vehicle and the respective components; and generate control signals to change power states used by the respective components, based on the power usage policy of the vehicle.

In Example 2, the subject matter of Example 1 optionally includes subject matter where the respective components comprise respective electronic control units (ECUs), wherein the operations to generate the control signals are performed in a central compute node of the vehicle, and wherein the central compute node is connected to the respective ECUs via a vehicle platform communication interface.

In Example 3, the subject matter of Example 2 optionally includes subject matter where the central compute node comprises a vehicle platform power management function, and wherein the control signals are provided to a vehicle platform power management agent executing in the respective ECUs.

In Example 4, the subject matter of Example 3 optionally includes subject matter where the operations to determine the power usage policy to apply in the vehicle are performed in a central system power management function executing in the central compute node of the vehicle.

In Example 5, the subject matter of any one or more of Examples 1-4 optionally include subject matter where the operational conditions of the vehicle are based on energy consumption and demand of the vehicle, and are provided in data maintained in the vehicle.

In Example 6, the subject matter of any one or more of Examples 1-5 optionally include subject matter where the operational conditions of the vehicle are based on energy consumption and demand applicable to the vehicle, and are provided in external data from a service remote to the vehicle.

In Example 7, the subject matter of Example 6 optionally includes subject matter where the data from the service relates to weather conditions, external conditions, fleet conditions, or vehicle operational features.

In Example 8, the subject matter of any one or more of Examples 1-7 optionally include subject matter where the instructions further cause the processor circuitry to perform operations to: generate control signals to change power states of at least one actuator or sensor system, based on the power usage policy of the vehicle.

In Example 9, the subject matter of any one or more of Examples 1-8 optionally include subject matter where the operational conditions of the vehicle and the respective components are associated with workload instances, and wherein the workload instances are managed by a vehicle system level manager executing in a central compute node of the vehicle.

In Example 10, the subject matter of any one or more of Examples 1-9 optionally include subject matter where the characteristics of the multiple components of the vehicle are defined with element descriptors, and wherein the element descriptors associate multiple power usage policies of the vehicle to individual power states of the respective components.

Example 11 is a vehicle power management system, comprising: a memory device to store data; and processing circuitry configured to: evaluate data that enumerates characteristics of multiple electronic control units (ECUs) of a vehicle; determine power usage characteristics of respective ECUs of the multiple ECUs of the vehicle from the data, the power usage characteristics including power requirements and available power states of the respective ECUs; determine a power usage policy to apply in the vehicle based on the power usage characteristics of respective ECUs and operational conditions of the vehicle, wherein the power usage policy includes restrictions for the vehicle and the respective ECUs; and generate control signals to change power states used by the respective ECUs, based on the power usage policy of the vehicle.

In Example 12, the subject matter of Example 11 optionally includes the processing circuitry further configured to: generate the control signals in a vehicle platform power management function executing in a central compute node of the vehicle, wherein the central compute node is connected to the respective ECUs via a vehicle platform communication interface; wherein the control signals are provided to a vehicle platform power management agent executing in the respective ECUs.

In Example 13, the subject matter of Example 12 optionally includes subject matter where operations to determine the power usage policy to apply in the vehicle are performed in a central system power management function executing in the central compute node of the vehicle.

In Example 14, the subject matter of any one or more of Examples 11-13 optionally include subject matter where the operational conditions of the vehicle are based on at least one of: energy consumption and demand of the vehicle, which are provided in data maintained in the vehicle; or energy consumption and demand applicable to the vehicle, which are provided in external data from a service remote to the vehicle, wherein the external data relates to weather conditions, external conditions, fleet conditions, or vehicle operational features.

In Example 15, the subject matter of any one or more of Examples 11-14 optionally include the processing circuitry further configured to: generate control signals to change power states of at least one actuator or sensor system, based on the power usage policy of the vehicle.

In Example 16, the subject matter of any one or more of Examples 11-15 optionally include subject matter where the operational conditions of the vehicle and the respective ECUs are associated with workload instances, and wherein the workload instances are managed by a vehicle system level manager executing in a central compute node of the vehicle.

In Example 17, the subject matter of any one or more of Examples 11-16 optionally include subject matter where the characteristics of the multiple ECUs of the vehicle are defined with element descriptors, and wherein the element descriptors associate multiple power usage policies of the vehicle to individual power states of the respective ECUs.

Example 18 is a process of making a central compute node for a vehicle, comprising: assembling circuitry and a storage device of the central compute node, the central compute node to be installed in the vehicle; and loading instructions in the storage device, wherein the instructions, when executed by the circuitry, cause the central compute node to: instantiate a power management control subsystem to control power usage of multiple electronic control units (ECUs) of the vehicle, wherein the control of the power usage is based on: power usage characteristics of respective ECUs of the multiple ECUs of the vehicle, the power usage characteristics including power requirements and available power states of the respective ECUs; and a power usage policy applied in the vehicle based on the power usage characteristics of the respective ECUs, power usage characteristics of the vehicle, and operating conditions of the vehicle and the respective ECUs; and provide control signals to change power states of the respective ECUs, based on the power usage policy of the vehicle.

In Example 19, the subject matter of Example 18 optionally includes subject matter where operations to provide the control signals that are performed by a vehicle platform power management function instantiated in the central compute node of the vehicle, and wherein operations to determine the power usage policy of the vehicle are performed in a central system power management function instantiated in the central compute node of the vehicle.

In Example 20, the subject matter of Example 19 optionally includes subject matter where characteristics of the multiple ECUs of the vehicle are defined in element descriptors of at least one data structure used by the power management control subsystem, and wherein the element descriptors associate multiple power usage policies of the vehicle to respective power states of the respective ECUs.

Example 21 is a process of constructing a central compute node for a vehicle, comprising: installing a machine-readable storage medium; installing processing circuitry to provide a central compute node; and writing instructions to the machine-readable storage medium, wherein the instructions, when executed, configure the central compute node to: instantiate a power management control subsystem to control power usage of multiple electronic control units (ECUs) of the vehicle, wherein the control of the power usage is based on: power usage characteristics of respective ECUs of the multiple ECUs of the vehicle, the power usage characteristics including power requirements and available power states of the respective ECUs; and a power usage policy applied in the vehicle based on the power usage characteristics of the respective ECUs, power usage characteristics of the vehicle, and operating conditions of the vehicle and the respective ECUs; and provide control signals that change power states of the respective ECUs, based on the power usage policy of the vehicle.

Example 22 is at least one machine-readable storage device comprising instructions stored thereupon, which when executed by circuitry of a computing system, cause the circuitry to perform the process of Example 21.

Example 23 is a computing system, comprising: memory to store power usage data associated with a vehicle; and circuitry to perform or implement the process of Example 21.

Example 24 is a process of manufacturing a vehicle, comprising: installing circuitry of a central compute node in the vehicle, the central compute node comprising circuitry; installing a plurality of electronic control units (ECUs) in the vehicle, the plurality of ECUs connected to the central compute node via a vehicle communication bus; and configuring the central compute node to operate a power management control subsystem in the central compute node that controls power usage of the plurality of ECUs, wherein control of the power usage is based on: power usage characteristics of respective ECUs of the plurality of ECUs, the power usage characteristics including power requirements and available power states of the respective ECUs; and a power usage policy applied in the vehicle based on the power usage characteristics of the respective ECUs, power usage characteristics of the vehicle, and operating conditions of the vehicle and the respective ECUs; and configuring the central compute node to provide control signals, via the vehicle communication bus, to change power states of the respective ECUs based on the power usage policy.

Example 25 is at least one machine-readable storage device comprising instructions stored thereupon, which when executed by circuitry of a computing system, cause the circuitry to perform the process of Example 24.

Example 26 is a computing system, comprising: memory to store power usage data associated with a vehicle; and circuitry to perform or implement the process of Example 24.

Example 27 is a process of instantiating a power management control subsystem in a software-defined vehicle, comprising: using a central compute node of the vehicle to create an instance of the power management control subsystem; associating the power management control subsystem with power usage from multiple electronic control units (ECUs) of the vehicle, by: determining power usage characteristics of respective ECUs of the multiple ECUs of the vehicle, the power usage characteristics including power requirements and available power states of the respective ECUs; and determining a power usage policy to apply in the vehicle based on the power usage characteristics of respective ECUs, power usage characteristics of the vehicle, and operating conditions of the vehicle and the respective ECUs; and configuring the power management control subsystem to provide control signals that change power states of the respective ECUs, based on the power usage policy of the vehicle.

Example 28 is at least one machine-readable storage device comprising instructions stored thereupon, which when executed by circuitry of a computing system, cause the circuitry to perform the process of Example 27.

Example 29 is a computing system, comprising: memory to store power usage data associated with a vehicle; and circuitry to perform or implement the process of Example 27.

Example 30 is a process to create a multi-mode power manager with a central compute node of a software-defined vehicle, comprising: creating a power profile by: obtaining power consumption and demand data within the vehicle; obtaining power consumption policies and algorithms provided by a service; and evaluating power usage and states of respective control subsystems by a central system power management subsystem operating in a central compute node of the vehicle; and evaluating power policies across the vehicle by a vehicle platform power management subsystem operating in the central compute node of the vehicle; creating power policies, based on the power profile, for respective control subsystems of the vehicle using vehicle platform power management agents located among the respective control subsystems of the vehicle; and installing the power policies in the central compute node.

Example 31 is at least one machine-readable storage device comprising instructions stored thereupon, which when executed by circuitry of a computing system, cause the circuitry to perform the process of Example 30.

Example 32 is a computing system, comprising: memory to store power usage data associated with a vehicle; and circuitry to perform or implement the process of Example 30.

Example 33 is a method for establishing and deploying a vehicle power policy in a software-defined vehicle based on a semantic representation, comprising: defining an agent ontology and element descriptors of the agent ontology, for a plurality of vehicle platform power management agents, each of the agents operating in a respective control subsystem of the vehicle; defining a vehicle ontology and element descriptors of the vehicle ontology, for a central system power management subsystem; generating a semantic representation for subsystems within the vehicle; providing a visual interface to receive a modification to the semantic representation for the subsystems within the vehicle, or to receive a modification to the element descriptors of the agent ontology or the element descriptors of the vehicle ontology; and deploying the modification of the element descriptors of the agent ontology or the element descriptors of the vehicle ontology to the vehicle platform power management agents and the central system power management subsystem.

Example 34 is at least one machine-readable storage device comprising instructions stored thereupon, which when executed by circuitry of a computing system, cause the circuitry to perform the method of Example 33.

Example 35 is a computing system, comprising: memory to store power usage data associated with a vehicle; and circuitry to perform or implement the method of Example 33.

Example 36 is a method for dynamic workload reconfiguration in a vehicle based on system-level key performance indicators, comprising: establishing a topology of compute elements and devices in the vehicle; establishing a profile map for modes to be used in the vehicle, each of the modes invoking respective operations with compute elements and devices of the vehicle; implementing a specific one of the modes in the vehicle, based on the profile map; monitoring workloads in the compute elements and devices of the vehicle, during the specific one of the modes; and modifying the workloads or operation of the compute elements and devices of the vehicle, to meet key performance indicators associated with the specific one of the modes.

Example 37 is at least one machine-readable storage device comprising instructions stored thereupon, which when executed by circuitry of a computing system, cause the circuitry to perform the method of Example 36.

Example 38 is a computing system, comprising: memory to store power usage data associated with a vehicle; and circuitry to perform or implement the method of Example 36.

Example 39 is an apparatus comprising respective means to implement of any of Examples 1-38.

Example 40 is a system to implement of any of Examples 1-38.

Embodiments to implement the approaches above may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Such components may be hardware, software, or firmware communicatively coupled to one or more processors in order to carry out the operations described herein. Components may be hardware components, and as such components may be considered tangible entities capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium. In an example, the software, when executed by the underlying hardware of the component, causes the hardware to perform the specified operations. Accordingly, a hardware component is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software; the general-purpose hardware processor may be configured as respective different components at different times. Software may accordingly configure a hardware processor, for example, to constitute a particular component at one instance of time and to constitute a different component at a different instance of time. Components may also be software or firmware implementations, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or components may, collectively or individually, be embodied as circuitry that forms part of a larger system, for example, an integrated circuit (IC), system on-chip (SoC), desktop computers, laptop computers, tablet computers, servers, smart phones, etc.

As used in the present disclosure, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in the present disclosure, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

Figure 15:
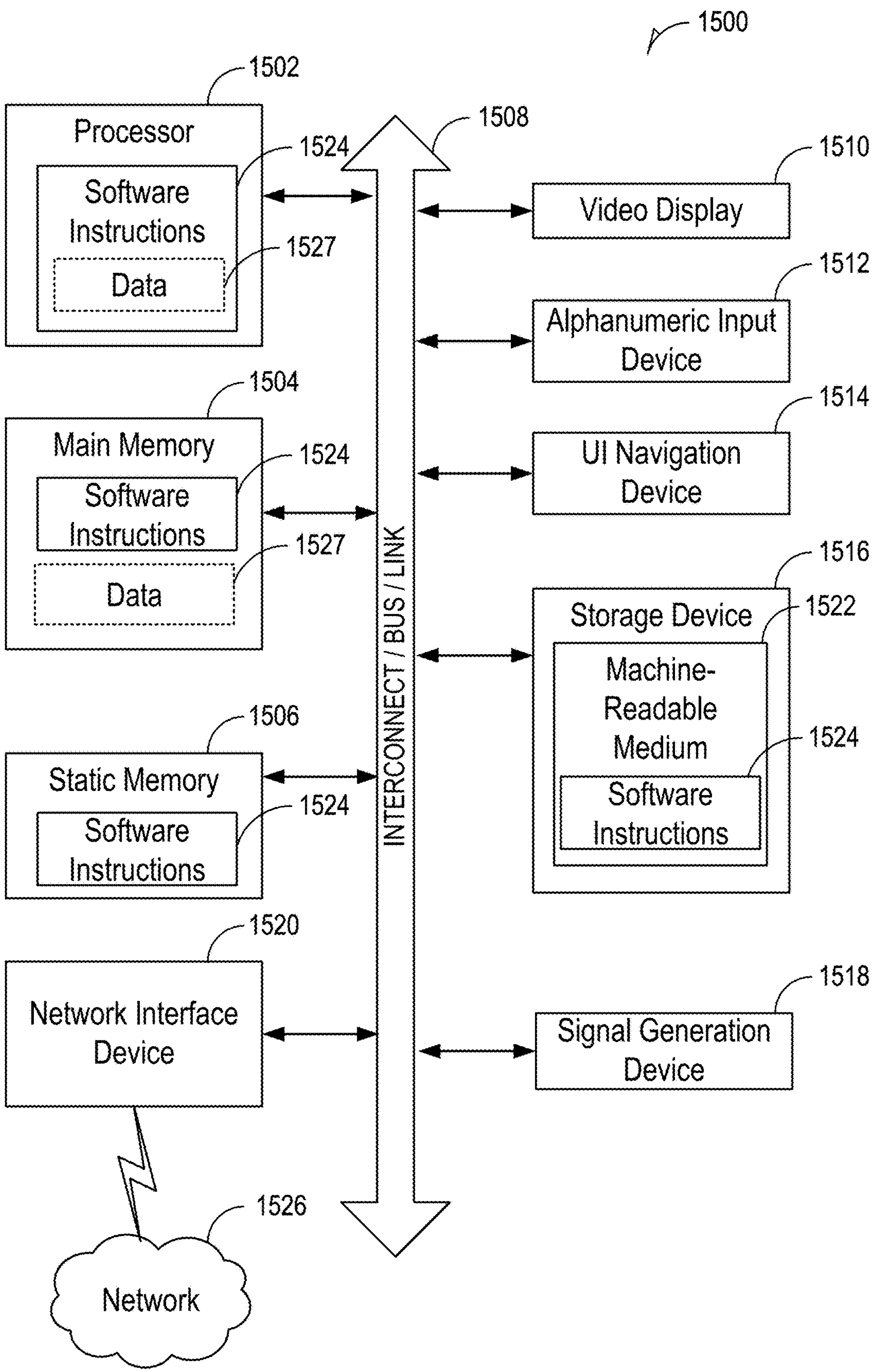
FIG. 15 is a block diagram illustrating an example machine upon which any one or more of the techniques (e.g., methodologies) discussed herein may perform, according to an example.

FIG. 15 is a block diagram illustrating a machine in the example form of a computer system 1500, within which a set or sequence of instructions may be executed to cause the machine to perform any one of the methodologies discussed herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a smartphone or other mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1500 includes at least one processor 1502 (e.g., a central processing unit (CPU), a graphics processing unit (GPU) or both, processor cores, compute nodes, etc.), a main memory 1504 and a static memory 1506, which communicate with each other via a link 1508 (e.g., interconnect or bus). The computer system 1500 may further include a video display unit 1510, an alphanumeric input device 1512 (e.g., a keyboard), and a user interface (UI) navigation device 1514 (e.g., a mouse). In one aspect, the video display unit 1510, input device 1512 and UI navigation device 1514 are incorporated into a touch screen display. The computer system 1500 may additionally include a storage device 1516 (e.g., a drive unit), a signal generation device 1518 (e.g., a speaker), a network interface device 1520, and one or more sensors (not shown, including but not limited to an image sensor used to capture images as discussed herein), such as a global positioning system (GPS) sensor, compass, accelerometer, gyrometer, magnetometer, or other sensor.

The storage device 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504, static memory 1506, and/or within the processor 1502 during execution thereof by the computer system 1500, with the main memory 1504, static memory 1506, and the processor 1502 also constituting machine-readable media. As an example, the software instructions 1524 may include instructions to implement and execute vehicle operation functions via the processor (e.g., with software as configured and operated in the examples of FIG. 3 to FIG. 14). As a further example, the main memory 1504 (or the other memory or storage such as static memory 1506, storage device 1516) may host various data 1527 used in connection with the vehicle operation functions discussed herein.

While the machine-readable medium 1522 is illustrated in an example aspect to be a single medium, the term "machine-readable medium" may include a single medium or multiple media (e.g., a centralized or distributed database, and/or associated caches and servers) that store the one or more instructions 1524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1524 may further be transmitted or received over a communications network 1526 using a transmission medium via the network interface device 1520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, 6G, DSRC, or satellite communication networks). The term "transmission medium" shall be taken to include any intangible medium that is capable of storing, encoding, or carrying instructions for execution by the machine, and includes digital or analog communications signals or other intangible medium to facilitate communication of such software.

The above-detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate aspect. The scope of the embodiments disclosed herein is to be determined with reference to the appended claims, along with the full scope of equivalents to which such claims are entitled.

What is claimed is:

1. A non-transitory machine-readable medium configured to store instructions that, when executed by processor circuitry of a vehicle, cause the processor circuitry to perform operations to:

evaluate data that enumerates characteristics of multiple components of the vehicle;

determine power usage characteristics of respective components of the vehicle from the data, the power usage characteristics including power requirements and available power states;

determine a power usage policy to apply in the vehicle based on the power usage characteristics of the respective components and operational conditions of the vehicle, wherein the power usage policy includes restrictions for the vehicle and the respective components; and generate, based on the power usage policy of the vehicle, control signals to change power states used by the respective components, wherein the control signals are generated via a central compute node of the vehicle comprising a power management control subsystem and a vehicle platform power management subsystem instantiated in the central compote node, and wherein the vehicle platform power management subsystem receives data from the respective components of the vehicle and provides, based on the received data, data structures to the power management control subsystem that enumerate power management capabilities of the respective components.

2. The at least one-non-transitory machine-readable medium of claim 1, wherein the respective components comprise respective electronic control units (ECUs), and wherein the central compute node is connected to the respective ECUs via a vehicle platform communication interface.

3. The at least one-non-transitory machine-readable medium of claim 2, wherein the control signals are provided to a vehicle platform power management agent executing in the respective ECUS.

4. The non-transitory machine-readable medium of claim 3, wherein the operations to determine the power usage policy to apply in the vehicle are performed in the central compute node of the vehicle.

5. The non-transitory machine-readable medium of claim 1, wherein the operational conditions of the vehicle are based on energy consumption and demand of the vehicle, and are provided in data maintained in the vehicle.

6. The non-transitory machine-readable medium of claim 1, wherein the operational conditions of the vehicle are based on energy consumption and demand applicable to the vehicle, and are provided in external data from a service remote to the vehicle.

7. The non-transitory machine-readable medium of claim 6, wherein the data from the service relates to weather conditions, external conditions, fleet conditions, or vehicle operational features.

8. The at least one-non-transitory machine-readable medium of claim 1, wherein the instructions further cause the processor circuitry to perform the operations to:

generate control signals to change power states of an actuator or a sensor system based on the power usage policy of the vehicle.

9. The non-transitory machine-readable medium of claim 1, wherein the operational conditions of the vehicle and the respective components are associated with workload instances, and wherein the workload instances are managed by a vehicle system level manager executing in a central compute node of the vehicle.

10. The non-transitory machine-readable medium of claim 1, wherein the characteristics of the multiple components of the vehicle are defined with element descriptors, and wherein the element descriptors associate multiple power usage policies of the vehicle to individual power states of the respective components.

11. The non-transitory machine-readable medium of claim 1, wherein the data is received from the respective components as part of a discovery process.

12. The non-transitory machine-readable medium of claim 1, wherein the power management capabilities include workload dependencies for the respective components.

13. A vehicle power management system, comprising:

a central compute node comprising a power management control subsystem and a vehicle platform power management subsystem instantiated in the central compute node;

a memory device configured to store data; and processing circuitry associated with the central compute node, the processing circuitry configured to:

evaluate data that enumerates characteristics of multiple electronic control units (ECUs) of a vehicle;

determine power usage characteristics of respective ECUs of the multiple ECUs of the vehicle from the data, the power usage characteristics including power requirements and available power states;

determine a power usage policy to apply in the vehicle based on the power usage characteristics of respective ECUs and operational conditions of the vehicle, wherein the power usage policy includes restrictions for the vehicle and the respective ECUs; and generate, based on the power usage policy of the vehicle, control signals to change power states used by the respective ECUs, wherein the vehicle platform power management subsystem receives data from the respective ECUs of the vehicle and provides, based on the received data, data structures to the power management control subsystem that enumerate power management capabilities of the respective ECUs.

14. The vehicle power management system of claim 13, wherein:

the processing circuitry is further configured to generate the control signals in the vehicle platform power management subsystem executing in the central compute node of the vehicle, the central compute node is connected to the respective ECUs via a vehicle platform communication interface, and the control signals are provided to a vehicle platform power management agent executing in the respective ECUs.

15. The vehicle power management system of claim 13, wherein the operational conditions of the vehicle are based on:

energy consumption and demand of the vehicle, which are provided in data maintained in the vehicle; or energy consumption and demand applicable to the vehicle, which are provided in external data from a service remote to the vehicle, wherein the external data relates to weather conditions, external conditions, fleet conditions, or vehicle operational features.

16. The vehicle power management system of claim 13, wherein the processing circuitry is further configured to generate the control signals to change power states of an actuator or a sensor system based on the power usage policy of the vehicle.

17. The vehicle power management system of claim 13, wherein the operational conditions of the vehicle and the respective ECUs are associated with workload instances, and wherein the workload instances are managed by a vehicle system level manager executing in a central compute node of the vehicle.

18. The vehicle power management system of claim 13, wherein the characteristics of the multiple ECUs of the vehicle are defined with element descriptors, and wherein the element descriptors associate multiple power usage policies of the vehicle to individual power states of the respective ECUs.

19. A process of making a central compute node for a vehicle, comprising:

assembling circuitry and a storage device of the central compute node, the central compute node to be installed in the vehicle; and loading instructions in the storage device, wherein the instructions, when executed by the circuitry, cause the central compute node to:

instantiate a power management control subsystem to control power usage of multiple electronic control units (ECUs) of the vehicle, wherein the control of the power usage is based on:

power usage characteristics of respective ECUs of the vehicle, the power usage characteristics including power requirements and available power states; and a power usage policy applied in the vehicle based on the power usage characteristics of the respective ECUs, power usage characteristics of the vehicle, and operating conditions of the vehicle and the respective ECUs; and providing, based on the power usage policy of the vehicle, control signals to change power states of the respective ECUs, wherein the control signals are generated via a central compute node of the vehicle comprising a power management control subsystem and a vehicle platform power management subsystem, and wherein the vehicle platform power management subsystem receives data from the respective ECUs of the vehicle and provides, based on the received data, data structures to the power management control subsystem that enumerate power management capabilities of the respective ECUs.

20. The process of claim 19, wherein the multiple ECUs of the vehicle are defined in element descriptors of at least one data structure used by the power management control subsystem, and wherein the element descriptors associate multiple power usage policies of the vehicle to respective power states of the respective ECUs.

* * * * *